(12) United States Patent
Uchino et al.

(10) Patent No.: US 6,434,460 B1
(45) Date of Patent: Aug. 13, 2002

(54) SUSPENSION CONTROL SYSTEM

(75) Inventors: Toru Uchino; Nobuyuki Ichimaru, both of Kanagawa-ken; Masaaki Uchiyama, Tokyo; Takahide Kobayashi, Saitama-ken, all of (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 09/911,617

(22) Filed: Jul. 25, 2001

(30) Foreign Application Priority Data

Jul. 31, 2000 (JP) ........................................ 2000-232131
Apr. 27, 2001 (JP) ........................................ 2001-133447

(51) Int. Cl.$^7$ ............................................ B60G 17/015
(52) U.S. Cl. ........................ 701/37; 701/38; 280/5.514; 280/5.515; 180/902
(58) Field of Search .............................. 701/37, 38, 39; 280/5.515, 5.507, 5.514, 5.513, 5.512; 180/41, 902; 188/266.1, 266.2, 266.4

(56) References Cited

U.S. PATENT DOCUMENTS

| 5,497,324 | A | * | 3/1996 | Henry et al. | ............. | 280/5.503 |
| 5,533,597 | A | | 7/1996 | Nezu et al. | ............... | 280/5.515 |
| 5,839,082 | A | * | 11/1998 | Iwasaki | .................... | 280/5.507 |
| 5,979,885 | A | * | 11/1999 | Katsuda | .................... | 188/266.1 |

* cited by examiner

Primary Examiner—Tan Nguyen
(74) Attorney, Agent, or Firm—Wenderoth, Lind & Ponack, L.L.P.

(57) ABSTRACT

By passing the vertical acceleration through a phase adjusting filter and a gain adjusting filter, the phase of the vertical acceleration is advanced by 49 degrees so that the phase difference with respect to the actual relative velocity becomes 180 degrees in the neighborhood of the vehicle body resonance point, thereby making the phase of the vertical acceleration, in effect, coincident with the phase of the relative velocity. In the neighborhood of the vehicle body resonance point (1 Hz), the gain of the estimated relative velocity takes a small value. In frequency regions other than the neighborhood of the vehicle body resonance point, the gain of the estimated relative velocity is increased. Consequently, the controlled variable in the neighborhood of the vehicle body resonance point increases, and the controlled variable in higher frequency regions decreases. Damping force is adjusted in correspondence to the controlled variable. Thus, it is possible to improve ride quality in the neighborhood of the vehicle body resonance point (1 Hz).

11 Claims, 28 Drawing Sheets

TABLE 1

| ELEMENTS OF CONVERSION SEGMENT 60 | | CONTROLLED VALUE (COMMAND CURRENT I) |
|---|---|---|
| DEAD ZONE HEIGHT H1 | SMALL | LARGE |
| | LARGE | SMALL |
| LIMIT VALUE H2 | SMALL | LARGE |
| | LARGE | SMALL |
| DEAD ZONE WIDTH W | SMALL | SMALL |
| | LARGE | LARGE |
| INCLINATION ANGLE β | SMALL | LARGE |
| | LARGE | SMALL |

TABLE 2

| MAP SETTING | CONTROLLED VALUE | ELEMENTS OF CONVERSION SEGMENT 60 |
|---|---|---|
| MAP FIRST SEGMENT 60a | SMALL | DEAD ZONE HEIGHT H1 : LARGE<br>LIMIT VALUE H2 : LARGE<br>DEAD ZONE WIDTH W : SMALL<br>INCLINATION ANGLE β : LARGE |
| MAP SECOND SEGMENT 60b | LARGE | DEAD ZONE HEIGHT H1 : SMALL<br>LIMIT VALUE H2 : SMALL<br>DEAD ZONE WIDTH W : LARGE<br>INCLINATION ANGLE β : SMALL |

|  | | DIRECTION OF MOTION OF VEHICLE | |
|---|---|---|---|
|  | | (V > 0) | (V < 0) |
| DAMPER STROKE | EXTENSION (V−X) > 0 | $C_1$ (VARIABLE) | $C_{min}$ (CONSTANT) |
| | COMPRESSION (V−X) < 0 | $C_{min}$ (CONSTANT) | $C_1$ (VARIABLE) |

SUSPENSION CONTROL SYSTEM

BACKGROUND OF THE INVENTION

The present invention relates to a suspension control system for use in a vehicle.

One example of conventional suspension control systems is disclosed in U.S. Pat. No. 5,533,597. A system according to the second embodiment shown in the patent publication includes a shock absorber of the variable damping coefficient type interposed between the body of a vehicle and an axle. The system further includes an actuator for adjusting the damping coefficient of the shock absorber. An acceleration sensor is attached to the vehicle body to detect a vertical acceleration acting on the vehicle body. An integrator circuit integrates the acceleration detected with the acceleration sensor to obtain the vertical velocity (absolute velocity, not relative velocity) of the vehicle body. Then, the absolute value of the vertical acceleration of the vehicle body is obtained, and the vertical velocity of the vehicle body obtained by the integration is divided by the absolute value of the vertical acceleration. The actuator is instructed to adjust the damping coefficient of the shock absorber on the basis of the value obtained by the division, thereby effecting vibration damping control for the vehicle body.

The above-described conventional suspension control system effects control resembling a control method based on the sky-hook damper theory.

According to the sky-hook damper theory, the damping coefficient C1 of the shock absorber (damper) provided between the vehicle body and the axle is obtained as follows:

Assuming that:

V: the vertical absolute velocity of the vehicle body (sprung mass);

X: the vertical absolute velocity of the axle (unsprung mass);

CZ: the damping coefficient of an imaginary shock absorber (damper) as provided between the vehicle body and a point in an absolute coordinate system;

if the following condition is satisfied;

$$V(V-X)>0$$

the damping coefficient C1 is determined as follows:

$$C1=CZV/(V-X) \qquad (1)$$

If the following condition is satisfied;

$$V(V-X)<0$$

the damping coefficient C1 is determined as follows:

$$C1=0 \qquad (2)$$

In the above-described conventional suspension control system, a vertical acceleration acting on the sprung mass is detected with only the vertical acceleration sensor provided on the vehicle body without using a stroke sensor, and the damping coefficient C1 is determined on the basis of the detected vertical acceleration as stated below. More specifically, because the vertical acceleration signal changes in a manner similar to that of the actual relative velocity (V−X), the vertical acceleration signal M is used as an estimated relative velocity according to the following control rules in place of the actual relative velocity (V−X) between the sprung mass and the unsprung mass in the above Equation (1). That is, the conventional suspension control system obtains the damping coefficient C1 on the basis of the sky-hook damper theory as follows:

If V(V−X)>0, $$C1=KV/M \qquad (1a)$$

If V(V−X)<0, $$C1=Cmin \qquad (2a)$$

In the above Equations (1a) and (2a), K is a constant and Cmin≠0.

With the acceleration sensor used in the above-described conventional suspension control system, the stroke of the shock absorber (damper) set out in FIG. 38 cannot be determined. Therefore, the suspension control system uses the above-described shock absorber of the variable damping coefficient type, in which when the damping coefficient for the extension stroke changes, the damping coefficient for the compression stroke becomes constant at a small value (Cmin), whereas when the compression-side damping coefficient changes, the extension-side damping coefficient becomes constant at a small value (Cmin).

Thus, the sign (positive or negative) of (V−X) in FIG. 38 (i.e., the stroke of the shock absorber) is not judged, but instead when V>0, a combination of C1 for extension and Cmin for compression is selected, and damping force for extension is controlled on the basis of C1. When V<0, a combination of Cmin for extension and C1 for compression is selected, and damping force for compression is controlled on the basis of C1.

The system may be arranged so that when C1 is positive, the damping coefficient for extension is controlled, whereas when C1 is negative, the damping coefficient for compression is controlled. In such a case, if it is possible to detect the vertical absolute velocity V of the vehicle body and the absolute value of the vertical acceleration signal M, it is possible to perform control approximate to the sky-hook damper theory by outputting C1 obtained by using the following Equation (1b):

$$C1=KV/|M| \qquad (1b)$$

Incidentally, the above-described prior art uses the vehicle body vertical acceleration signal M as data that can be regarded as approximation to the actual relative velocity (V−X). In actuality, however, there is a phase difference between the vehicle body vertical acceleration signal 71 and the actual relative velocity 72, as shown in FIG. 39, under the influence of spring force and so forth [FIG. 39 shows an example of measurement of the vertical acceleration and relative velocity of the body of an automobile of a certain type when the vehicle body vibrates at 1 Hz, in which the phase of the vehicle body vertical acceleration signal 71 leads that of the actual relative velocity 72 by 131 degrees].

Because there is a phase difference between the vehicle body vertical acceleration signal 71 and the actual relative velocity 72, ideal damping characteristics such as those obtained on the basis of the sky-hook damper theory cannot be obtained with the conventional suspension control system that uses the vehicle body vertical acceleration signal 71 as an estimated relative velocity in-place of the relative velocity 72 corresponding to the relative velocity (V−X) in the sky-hook damper theory. Accordingly, ride quality is not always good, particularly in a sprung resonance frequency band at relatively low frequencies (i.e. a frequency band in which vibration of the vehicle body influences ride quality to a considerable extent).

SUMMARY OF THE INVENTION

The present invention was made in view of the above-described circumstances.

Accordingly, an object of the present invention is to provide a suspension control system capable of obtaining damping characteristics closer to those obtained on the basis of the sky-hook damper theory by improving controllability in the sprung resonance frequency band, in particular, in consideration of the above-described phase difference due to spring force and so forth.

The present invention provides a suspension control system including a shock absorber having adjustable damping characteristics that is interposed between sprung and unsprung members of a vehicle. A sprung mass vibration detecting device detects vibration of the sprung member of the vehicle. A sprung mass absolute velocity detecting device obtains the absolute velocity of the vibration of the sprung member from the detected signal obtained from the sprung mass vibration detecting device. A relative velocity estimation unit adjusts the phase of the detected signal obtained from the sprung mass vibration detecting device to use the detected signal as an estimated relative velocity between the sprung and unsprung members. A control unit generates a control signal for controlling the damping characteristics of the shock absorber on the basis of the absolute velocity obtained from the sprung mass absolute velocity detecting device and the estimated relative velocity obtained from the relative velocity estimation unit and outputs the control signal to the shock absorber. The relative velocity estimation unit adjusts the phase of the detected signal so that the phase difference of the detected signal with respect to the actual relative velocity is minimized in the sprung mass resonance frequency band.

Preferably, the phase adjustment for the detected signal is made on the basis of adjusting parameters for the detected signal, and the characteristics of the adjusting parameters are changed according to the condition of the vehicle.

Preferably, the control device judges the road surface condition on the basis of the detected signal obtained from the sprung mass vibration detecting device, and the phase adjustment for the detected signal is made on the basis of adjusting parameters for the detected signal. Further, the characteristics of the adjusting parameters are changed according to the result of the judgment on the road surface condition.

Preferably, the control device converts the relative velocity obtained from the relative velocity estimation unit into a signal for generating the control signal on the basis of predetermined conversion characteristics and changes the conversion characteristics according to the condition of the vehicle or/and the road surface condition.

The above and other objects, features and advantages of the present invention will become more apparent from the following description of the preferred embodiments thereof, taken in conjunction with the accompanying drawings.

DETAILED DESCRIPTION OF THE INVENTION

Figure 1:
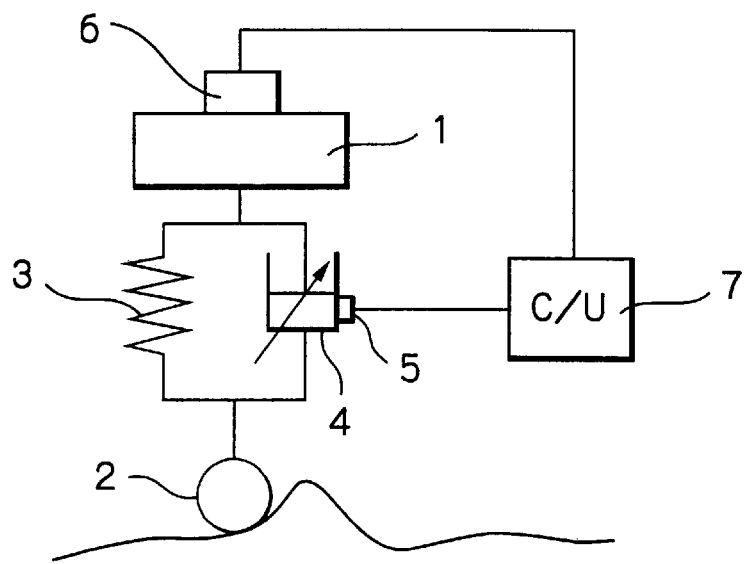
FIG. 1 is a diagram schematically showing a suspension control system according to a first embodiment of the present invention.

A suspension control system according to a first embodiment of the present invention will be described below with reference to FIGS. 1 to 4. In FIG. 1, a spring 3 and a shock absorber 4 having adjustable damping characteristics are interposed in parallel between a vehicle body 1 (sprung mass) and each of; four wheels 2 (unsprung mass; only one of them is shown in the figure), which constitute an automobile (vehicle). The spring 3 and the shock absorber 4 support the vehicle body 1.

Figures 38, 39:
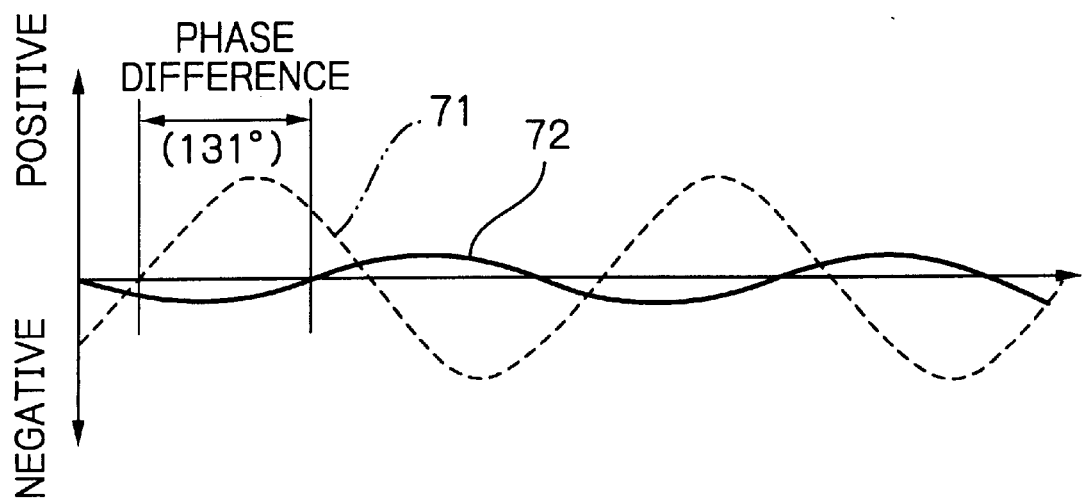
FIG. 38 is a diagram showing the relationship between the direction of motion of the sprung mass and the shock absorber stroke in the form of a table.
FIG. 39 is a waveform chart showing the phase difference between the vertical acceleration and vertical relative velocity of the vehicle body in the prior art.

It should be noted that in the first embodiment and second to sixteenth embodiments (described later), the suspension control system according to the present invention is applied to an automobile of the type having such characteristics that, as shown in FIG. 39, the phase of the vehicle body vertical acceleration signal 71 leads that of the actual relative velocity 72 by 131 degrees, by way of example.

Figure 2:
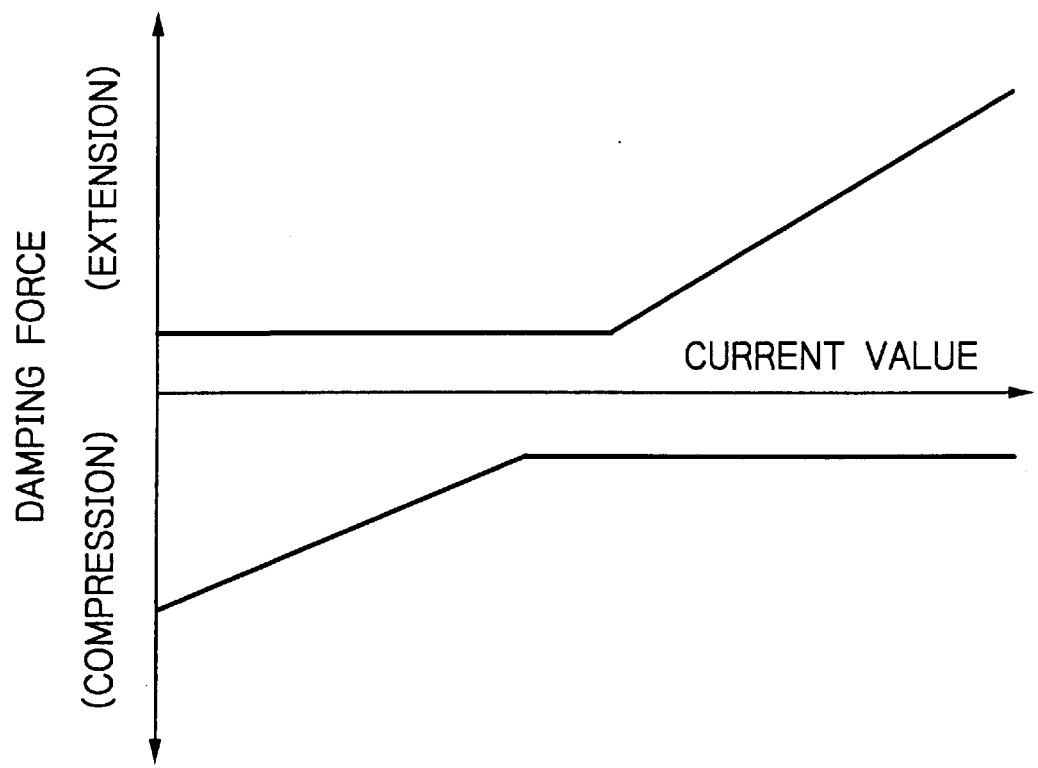
FIG. 2 is a diagram showing damping force characteristics of a shock absorber used in the suspension control system shown in FIG. 1.

The shock absorber 4 is of the extension/compression inverting type in which, as shown in FIG. 2, when the compression-side damping force has a small value ("soft" damping characteristics), the extension-side damping force is varied between a small value ("soft" damping characteristics) and a large value ("hard" damping characteristics), whereas when the extension-side damping force has a small value, the compression-side damping force is varied between a small value and a large value. The shock absorber 4 is provided with an actuator 5 for adjusting the damping force (damping coefficient) of the shock absorber 4 by actuating a damping force adjusting mechanism (not shown) provided in the shock absorber 4.

An acceleration sensor 6 (sprung vibration detecting device) is mounted on the vehicle body 1 to detect the vertical acceleration (sprung acceleration) M of the vehicle body 1 relative to the absolute coordinate system. The acceleration M (detected signal) detected with the acceleration sensor 6 is supplied to a controller 7 (control device). It should be noted that a total of four combinations of springs 3, shock absorbers 4 and so forth as shown in FIG. 1 are provided to correspond to the four wheels 2; however, only one combination is shown in the figure for the sake of convenience.

Figure 3:
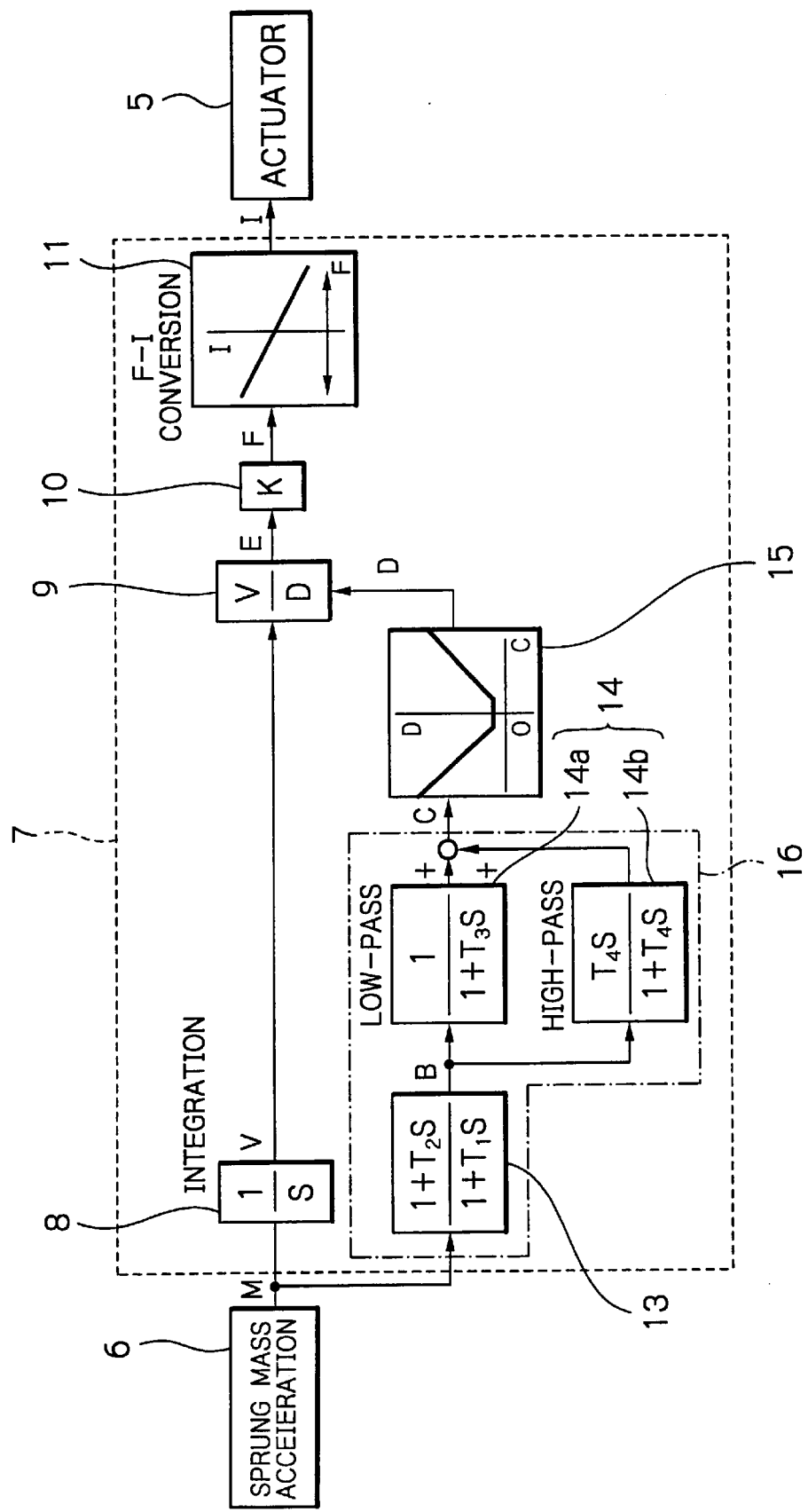
FIG. 3 is a block diagram schematically showing the arrangement of a controller used in the suspension control system shown in FIG. 1.

As shown in FIG. 3, the controller 7 has an integrator circuit 8 (sprung mass absolute velocity detecting device) for obtaining the vertical velocity (absolute velocity) V by integrating the acceleration M. A divider circuit 9 divides the absolute velocity V by a signal D (described later) to obtain a corrected signal E. An amplifier circuit 10 multiplies the corrected signal E by a control gain K of a predetermined magnitude to obtain a signal F. A command signal output unit 11 (control signal output unit) obtains a command current I with a magnitude corresponding to the signal F obtained from the amplifier circuit 10 and supplies the command current I (control signal) to the actuator 5 to adjust the damping force of the shock absorber 4. With this arrangement, the controller 7 effects vibration damping control for the automobile (vehicle) to ensure favorable ride quality and steering stability. It should be noted that although the controller 7 is provided for each wheel in the foregoing arrangement, the suspension control system may be arranged to control the four wheels with a single controller. In such a case, it is desirable that the contents of the control operation shown in FIG. 3 should be calculated independently for each wheel.

Further, although FIG. 3 shows only the basic control for controlling the vertical vibration of each wheel, the signals M, V, D, E and F may be corrected according to vehicle body attitude change conditions, e.g. rolling and pitching, road surface condition, and various running conditions, e.g. vehicle speed. The correction of the signals M, V, D, E and F may be made by various methods, for example, by multiplying each signal by a gain, or adding a value to each signal, or providing a dead zone and adjusting the width of the dead zone.

The controller 7 further has a phase adjusting filter 13 supplied with the acceleration M from the acceleration sensor 6 as an input to adjust the acceleration M to the same phase as that of the actual relative velocity in the vicinity of the sprung mass resonance frequency band. A gain adjusting filter 14 processes the phase-adjusted signal B through a low-pass filter 14a and a high-pass filter 14b to generate a signal C. An absolute value computing unit 15 obtains the absolute value of the signal C [a signal obtained from the absolute value computing unit 15 will hereinafter be referred to as "signal D", and the magnitude of the signal D is defined as "gain D"]. The phase adjusting filter 13 and the gain adjusting filter 14 constitute in combination a relative velocity estimation unit 16.

The phase adjusting filter 13 has a transfer function G1(s) shown by the following Equation (3), which contains a phase-lead element:

$$G1(s)=(1+T2s)/(1+T1s) \quad (3)$$

where T1 and T2 are time constants.

The phase adjusting filter 13 advances the phase of the vertical acceleration M, which leads the phase of the actual relative velocity by a predetermined angle as shown in FIG. 39, by a predetermined angle so that the phase difference becomes 0 degree, for example. Thus, the vertical acceleration M is adjusted so as to be in phase with the relative velocity. The phase-adjusted vertical acceleration M is outputted as an estimated relative velocity (signal B).

Figure 4:
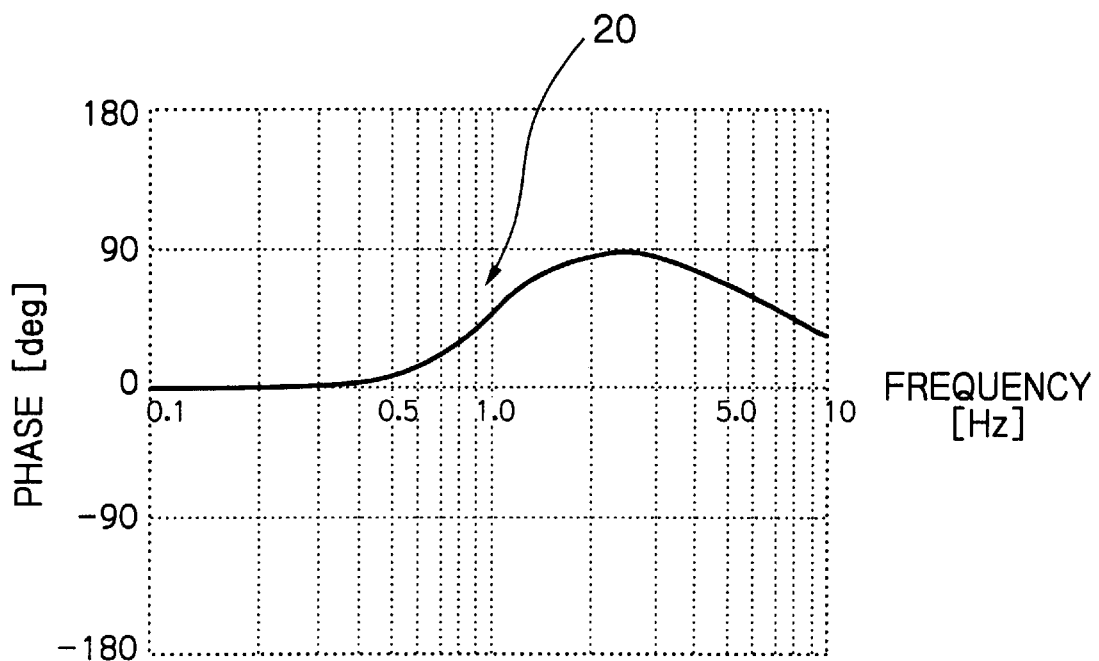
FIG. 4 is a diagram showing frequency-phase characteristics of a phase adjusting filter of the controller shown in FIG. 3.

In this embodiment, the phase of the vertical acceleration M leads that of the actual relative velocity by 131 degrees. By passing the vertical acceleration M through the phase adjusting filter 13, the phase of the vertical acceleration M is advanced by 49 degrees when the road surface input is in the neighborhood of 1 Hz (hereinafter referred to as "the neighborhood of vehicle body resonance point") 20 corresponding to the vehicle body resonance point [sprung mass resonance frequency; 1 Hz] as shown in FIG. 4, so that the phase difference with respect to the actual relative velocity becomes 180 degrees. Because the signal outputted from the phase adjusting filter 13 becomes the absolute value through the absolute value computing unit 15, the phase of the vertical acceleration M is made, in effect, coincident with that of the actual relative velocity by providing a phase difference of 180 degrees therebetween.

The phase adjusting filter 13 outputs the vertical acceleration B (estimated relative velocity) adjusted so as to be in phase with the actual relative velocity to the gain adjusting filter 14.

In this embodiment, the time constants T1 and T2 are determined as follows. For the time constant T1=1/(2πf1), f1 is set equal to 50 Hz. For the time constant T2=1/(2πf2), f2 is set equal to 0.85 Hz.

The gain adjusting filter 14 comprises a low-pass filter 14a and a high-pass filter 14b connected in parallel to the output terminal of the phase adjusting filter 13. The gain adjusting filter 14 adds together the outputs from the low-pass filter 14a and the high-pass filter 14b to obtain a band-pass signal C and outputs the band-pass signal C to the absolute value computing unit 15.

The low-pass filter 14a and the high-pass filter 14b have transfer functions G2 (s) and G3 (s) shown by the following Equations (4) and (5), respectively, and consequently, the gain adjusting filter 14 has a transfer function G4 (s) shown by the following Equation (6):

$$G2(s)=1/(1+T3s) \quad (4)$$

where T3 is a time constant.

$$G3(s)=T4s/(1+T4s) \quad (5)$$

where T4 is a time constant.

$$G4(s)=1/(1+T3s)+T4s/(1+T4s) \quad (6)$$

Figure 5:
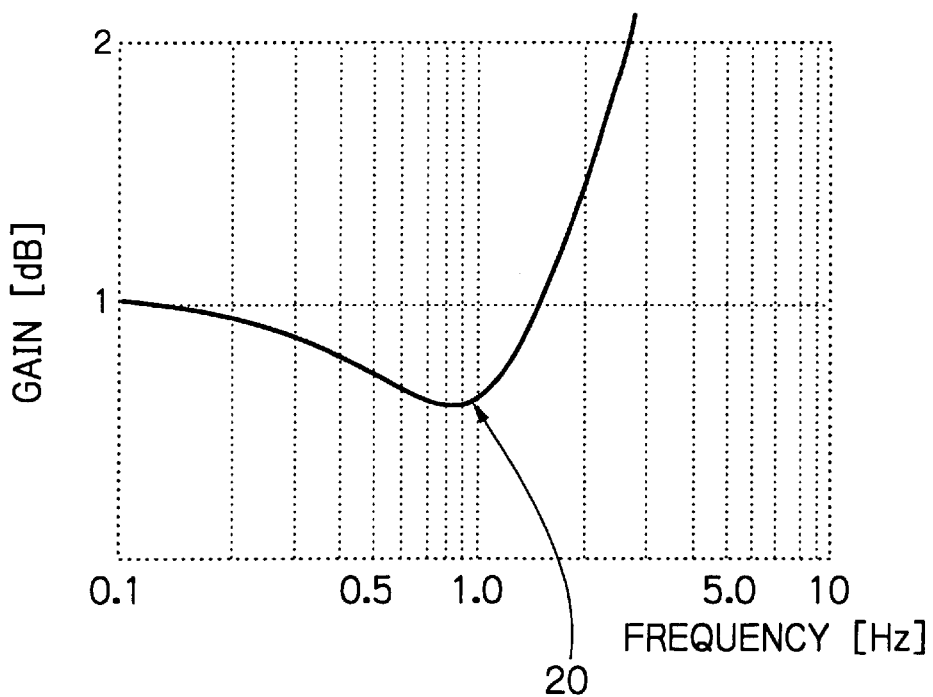
FIG. 5 is a diagram showing frequency-gain characteristics of a gain adjusting filter of the controller shown in FIG. 3.

The gain adjusting filter 14 adjusts the gain of the estimated relative velocity to generate the signal C (and thus the signal D), in a manner as shown in FIG. 5. That is, in the neighborhood of vehicle body resonance point 20, the gain adjusting filter 14 reduces the gain of the estimated relative velocity. In frequency regions other than the neighborhood of vehicle body resonance point 20, the gain adjusting filter 14 increases the gain of the estimated relative velocity.

In this embodiment, the time constants T3 and T4 are determined as follows. For the time constant T3=1/(2πf3), f3 is set equal to 0.5 Hz. For the time constant T4=1/(2πf4), f4 is set equal to 2.0 Hz.

For the time constants T1, T2, T3 and T4, optimum values should be set in accordance with the weight of the vehicle, the spring constant of the spring provided between the sprung and unsprung members, etc. (i.e.. the type of vehicle).

In this embodiment, the damping coefficient C2 is obtained as follows:

If V(V−X)>0, $$C2=KV/D \quad (1c)$$

If V(V−X)<0, $$C2=Cmin \quad (2c)$$

In the suspension control system arranged as stated above, the phase adjusting filter 13 and the gain adjusting filter 14 are arranged to act on the acceleration M from the acceleration sensor 6. That is, the phase adjusting filter 13 advances the vertical acceleration M by 49 degrees in the neighborhood of vehicle body resonance point 20 so that the vertical acceleration M has a phase difference of 180 degrees with respect to the actual relative velocity, thereby making the phase of the vertical acceleration M coincident, in effect, with the phase of the relative velocity in the neighborhood of vehicle body resonance point 20. Further, the gain adjusting filter 14 adjusts the gain of the estimated relative velocity to generate the signal C in such a manner that in the neighborhood of vehicle body resonance point 20, the gain adjusting filter 14 reduces the gain of the estimated relative velocity, whereas in frequency regions other than the neighborhood of vehicle body resonance point 20, the gain adjusting filter 14 increases the gain of the estimated relative velocity. Thus, when the divider circuit 9 performs the calculation of (V/D), a coefficient E (corrected signal E) having a large value is obtained in the neighborhood of vehicle body resonance point 20. Consequently, the controlled variable in the neighborhood of vehicle body resonance point 20 increases, and the controlled variable in higher frequency regions decreases. Damping force is adjusted in correspondence to the controlled variable. Thus, it is possible to improve ride quality in the neighborhood of vehicle body resonance point (1 Hz).

Figure 6:
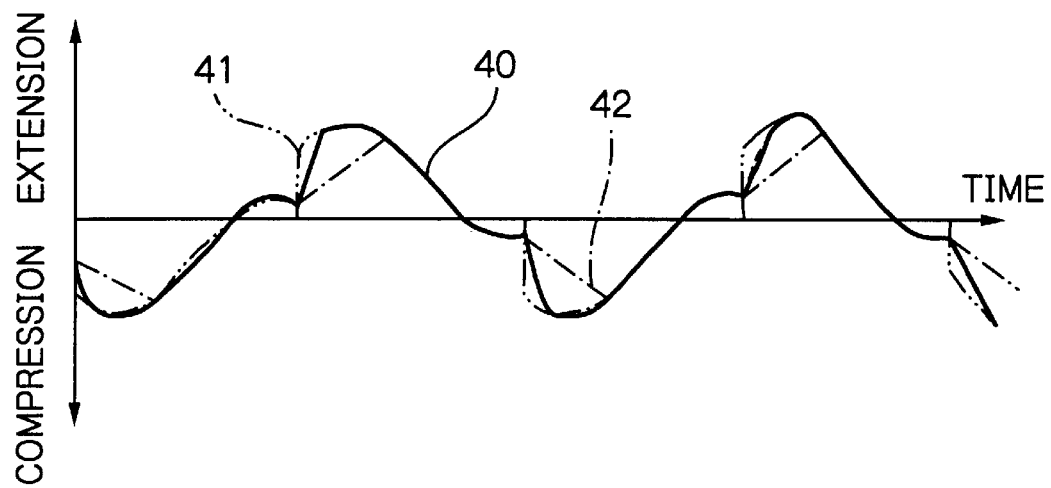
FIG. 6 is a diagram showing damping force characteristics obtained with the suspension control system shown in FIG. 1 in comparison with a conventional system and a theoretical value.

When damping force 40 expected to be obtained by this embodiment (i.e. damping force generated according to the new control rules) was determined by computation, the data as shown in FIG. 6 was obtained. The damping force 40 generated according to the new control rules is equal in peak to the damping force 41 according to the sky-hook damper theory (i.e. theoretical damping force). In comparison with damping force 42 generated by the above-described prior art, the damping force 40 is closer to the theoretical damping force 41. Thus, it was confirmed that this embodiment allows an improved control.

Further, the suspension control system according to this embodiment uses a damping coefficient varying type shock absorber 4 having invertible damping characteristics.

Accordingly, it is not required to sense the stroke (direction) of the shock absorber 4 (damper). Thus, vibration damping control for an automobile (vehicle) can be effected to ensure favorable ride quality of steering stability by using the acceleration sensor 6, which is relatively inexpensive, in place of a costly sensor such as a stroke sensor. Therefore, costs can be reduced correspondingly. It should be noted that the shock absorber 4 is not necessarily limited to the above-described damping coefficient varying type shock absorber having invertible damping characteristics. As a matter of course, a sensor, such as a stroke sensor which is capable of determining the stroke of a shock absorber (damper), may be used. In such a case, a shock absorber of non-invertible damping characteristics (with the damping characteristics varying in similar ways in both extension and compression strokes) can be used.

Figure 7:
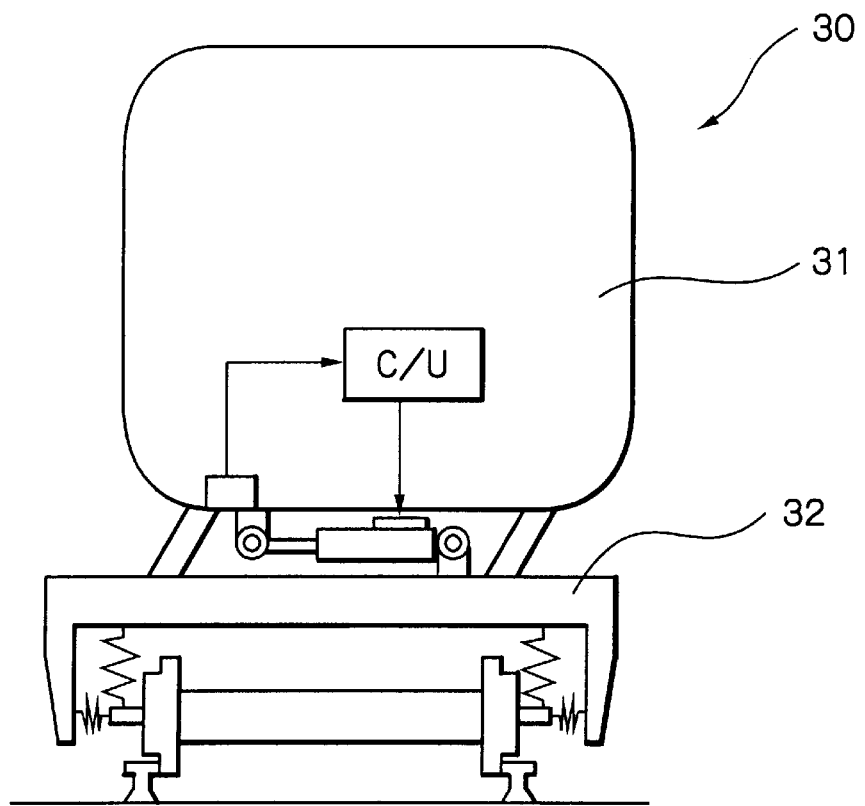
FIG. 7 is a diagram schematically showing a railway vehicle to which the suspension control system according to the present invention is applied in place of an automobile.

In the foregoing embodiment, the suspension control system is used in an automobile, by way of example. The suspension control system is also usable in a railway vehicle 30, as shown in FIG. 7, by replacing the vertical acceleration of the vehicle body 1 with the horizontal acceleration of the body 31 of the railway vehicle 30 and replacing the vertical absolute velocity of the vehicle body 1 with the horizontal absolute velocity of the vehicle body 31 and further replacing the axle with the truck 32. The fact that the suspension control system according to the present invention is applicable to a railway vehicle in place of an automobile holds true for the following second to sixteenth embodiments.

In the foregoing embodiment, the magnitude of extension-side and compression-side damping force of the shock absorber 4 is varied according to the magnitude of electric current corresponding to the command signal from the command signal output unit 11 (see FIG. 2), by way of example. However, the arrangement may be such that damping characteristic positions H/S, S/S and S/H are selectably provided for the shock absorber 4 to allow setting of a desired combination of damping force characteristics for the extension and compression sides, i.e. a combination of "hard" damping characteristics for the extension side and "soft" damping characteristics for the compression side, or a combination of "soft" for the extension side and "soft" for the compression side, or a combination of "soft" for the extension side and "hard" for the compression side. In this case, the command signal outputted from the command signal output unit 11 is arranged to select one of the damping characteristic positions H/S, S/S and S/H. It should be noted that this holds true for the following second to sixteenth embodiments.

Although in the foregoing embodiment the phase adjusting filter 13 contains a phase-lead element for advancing the phase, the present invention is not necessarily limited thereto. The phase adjusting filter 13 may contain a phase-lag element for adjusting the phase by retarding it. In other words, the phase adjusting filter 13 may contain any phase adjusting element capable of phase adjustment so that points at which each signal intersects the horizontally extending time axis are coincident with each other. It should be noted that this holds true for the following second to sixteenth embodiments.

Next, a second embodiment of the present invention will be described with reference to FIGS. 8 to 13. It should be noted that illustration and description of members or portions equivalent to those in the first embodiment (FIGS. 1 to 7) are omitted according to circumstances.

Figure 8:
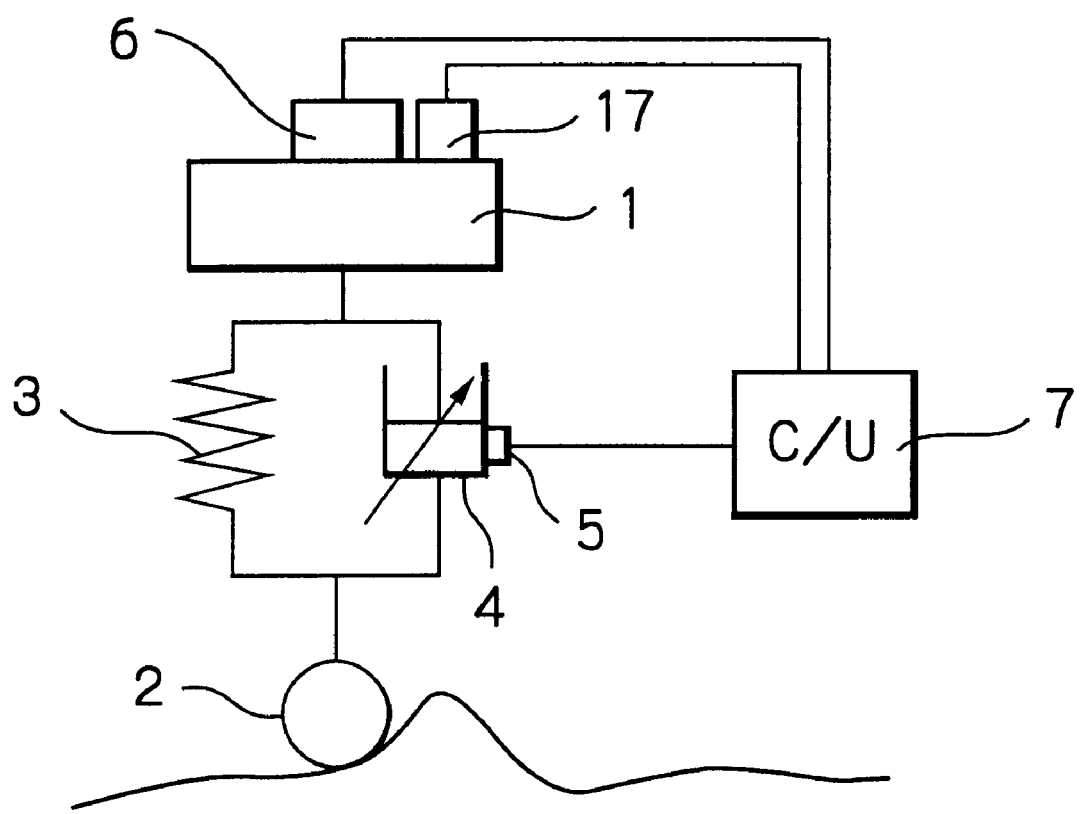
FIG. 8 is a diagram schematically showing a suspension control system according to a second embodiment of the present invention.
Figure 9:
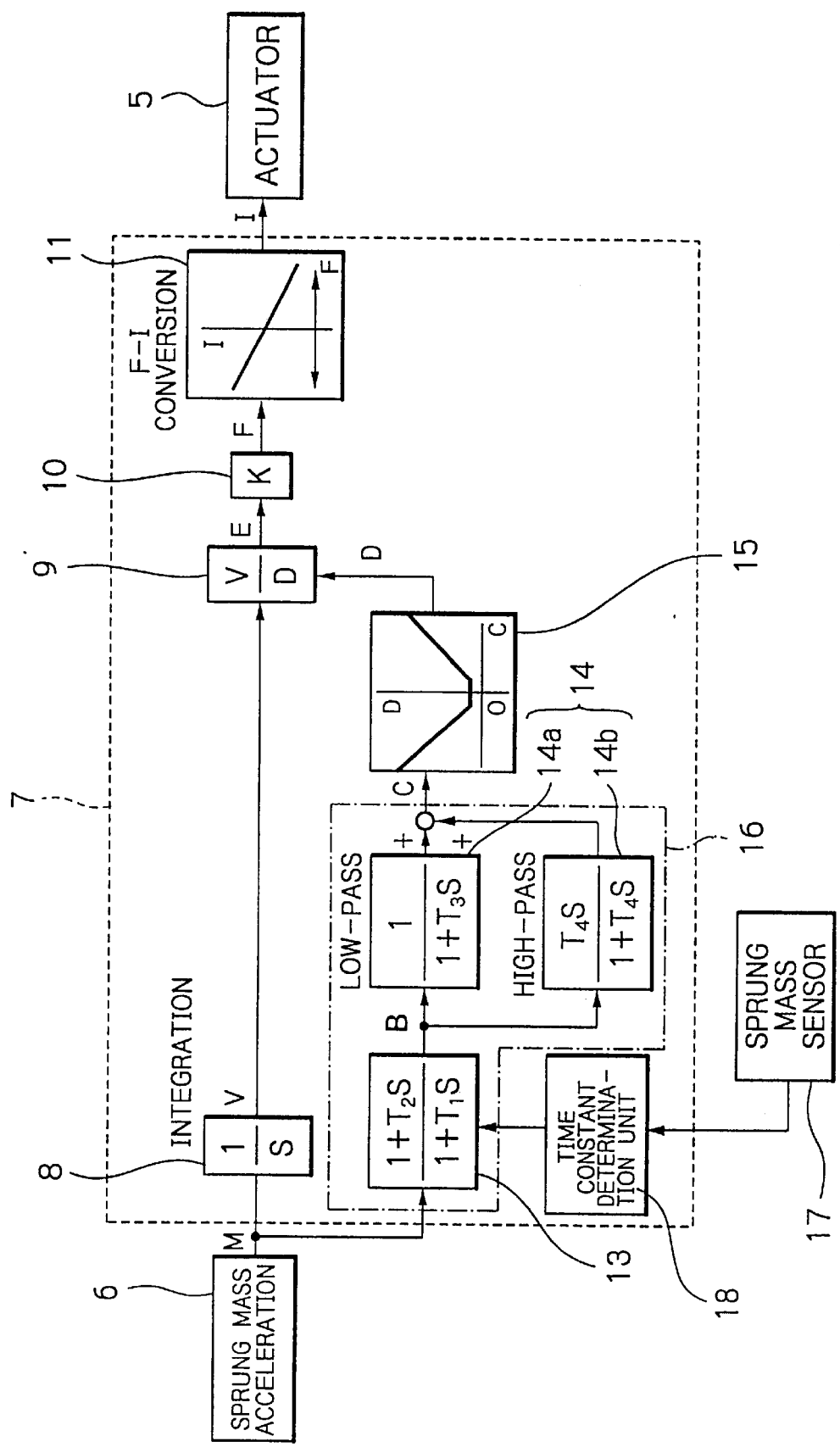
FIG. 9 is a block diagram schematically showing the arrangement of a controller used in the suspension control system shown in FIG. 8.

The second embodiment differs from the first embodiment mainly in the following points (a) to (c):

(a) As shown in FIGS. 8 and 9, a sprung mass sensor 17 is provided to detect the weight P1 of the Vehicle (sprung mass).

(b) The time constants T1, T2, T3 and T4 of the relative velocity estimation unit 16 and hence filter constants (gain and phase) [adjusting parameters for the acceleration M] are variable. Moreover, the controller 7 is provided with a time constant determination unit 18.

(c) The controller 7 adjusts the phase of the acceleration M (detected signal) from the, acceleration sensor 6 on the basis of the filter constants (gain and phase) [adjusting parameters for the acceleration M] of the relative velocity estimation unit 16, and changes the filter constants (gain and phase) by determining the values of the time constants T1, T2, T3 and T4 according to the result of detection by the sprung mass sensor 17.

The controller 7 has a vehicle weight reference value P0 stored therein to make a comparison with the vehicle weight P1 detected by the sprung mass sensor 17. The controller 7 performs a comparative operation using the vehicle weight reference value P0 as described later. The contents of arithmetic control performed by the controller 7 will be described below with reference to FIGS. 10 and 11.

Figure 10:
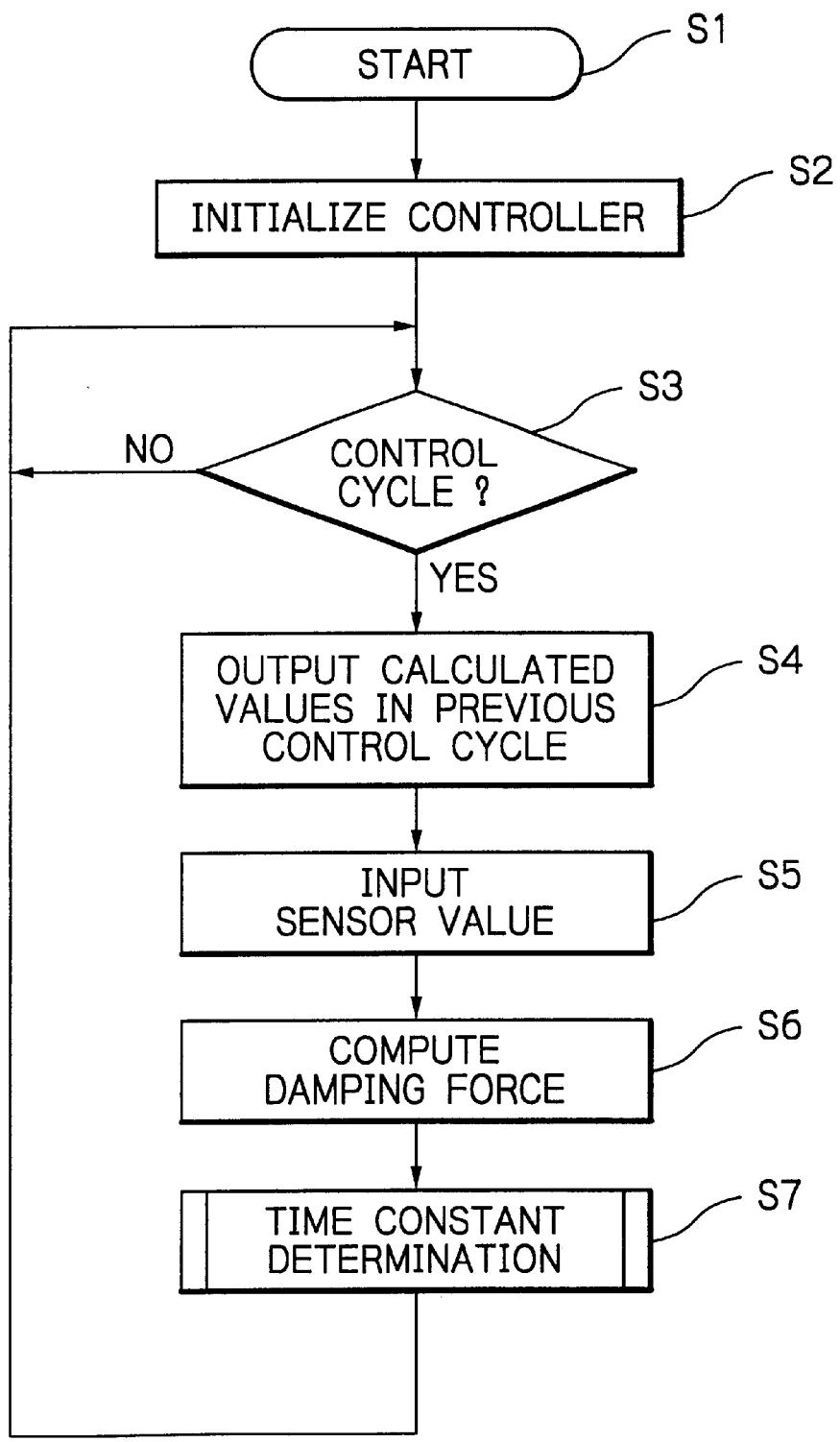
FIG. 10 is a flowchart showing a main routine executed by the controller used in the suspension control system shown in FIG. 8.

In FIG. 10, the controller 7 starts execution of control software as the power supply is turned on (step S1). First, the controller 7 executes initialization (step S2).

Next, the controller 7 judges whether or not a predetermined control cycle has elapsed (step S3). If it is judged at step S3 that the predetermined control cycle has not yet elapsed, the controller 7 returns upstream to judge again whether or not the predetermined control cycle has elapsed.

If it is judged at step S3 that the predetermined control cycle has elapsed, the controller 7 outputs the contents of the operation executed in the previous control cycle (i.e. the command current I having a magnitude corresponding to the signal F obtained by the amplifier circuit 10, etc.) to the actuator 5 to adjust the damping force of the shock absorber 4 (step S4).

Subsequently to step S4, sensor information is read from the acceleration sensor 6, the sprung mass sensor 17 and various sensors not illustrated (step S5). At step S5, the controller 7 outputs a signal to each port (not shown). Next, the controller 7 judges the condition of the vehicle and performs necessary computation such as computation of damping force (step S6). Subsequently to step S6, the controller 7 executes a time constant determination subroutine (step S7) and then returns to step S3.

At step S6, the controller 7 also performs computation to calculate the sprung mass resonance frequency and the phase difference between the sprung mass acceleration and the actual relative velocity in the neighborhood of the resonance point on the basis of the vehicle weight P1 (sprung mass) from the sprung mass sensor 17 and so forth. On the basis of the result of the computation, the controller 7 determines the values of the time constants T1, T2, T3 and T4 in the time constant determination subroutine at step S7 as stated below, thereby adjusting the gain D, the phase, etc.

Figure 11:
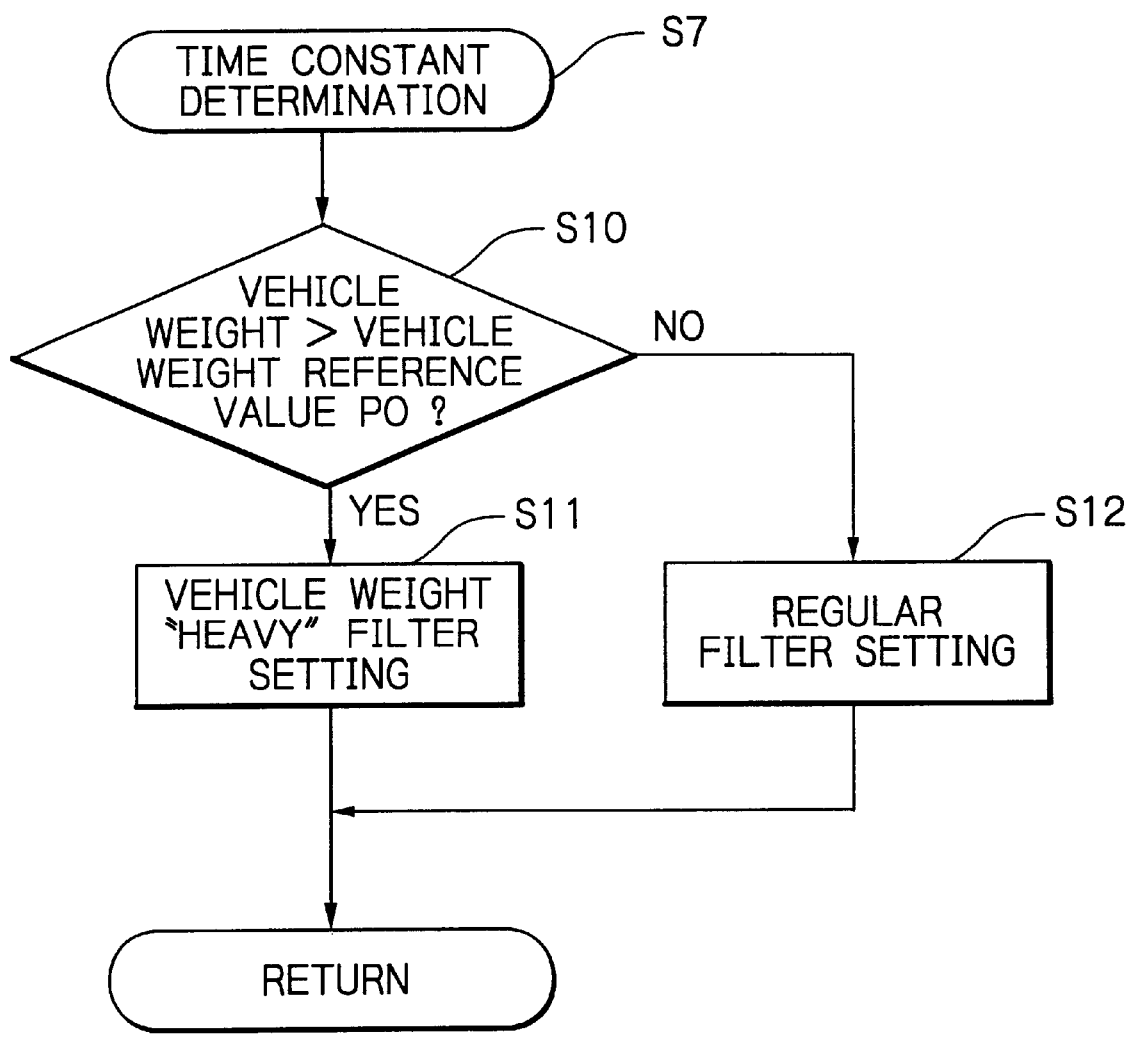
FIG. 11 is a flowchart showing a time constant determination subroutine in FIG. 10.

In the time constant determination subroutine, as shown in FIG. 11, the controller 7 judges whether or not the vehicle weight P1 exceeds the vehicle weight reference value P0 (step S10). If it is judged at step S10 that the vehicle weight P1 exceeds the vehicle weight reference value P0 (YES), the controller 7 executes the operation at step S11. At step S11, the controller 7 determines the values of the time constants T1, T2, T3 and T4 so that the following condition will be obtained, and then returns to the main routine shown in FIG. 10. That is, the values of the time constants T1, T2, T3 and T4 are determined so that as shown by the curve "After Correction" in FIG. 13, the gain D of the signal C and thus the signal D (corresponding to the estimated relative velocity) becomes smaller than in the case of "Before Correction" in FIG. 13 as a whole [particularly smaller in the neighborhood of vehicle body resonance point 20 (i.e. in the neighborhood of sprung mass resonance frequency)], and, as shown by the curve "After Correction" in FIG. 12, the phase of the vertical acceleration M becomes larger (advanced) than in the case of "Before Correction" in FIG. 12 in the neighborhood of vehicle body resonance point 20 and in frequency regions higher than the resonance point 20.

If it is judged at step S10 that the vehicle weight P1 is not in excess of the vehicle weight reference value P0 (NO), the controller 7 determines the values of the time constants T1, T2, T3 and T4 so that the gain D of the signal D (corresponding to the estimated relative velocity) in the neighborhood of the sprung mass resonance frequency becomes large (step S12), and then returns to the main routine shown in FIG. 10.

Figure 12:
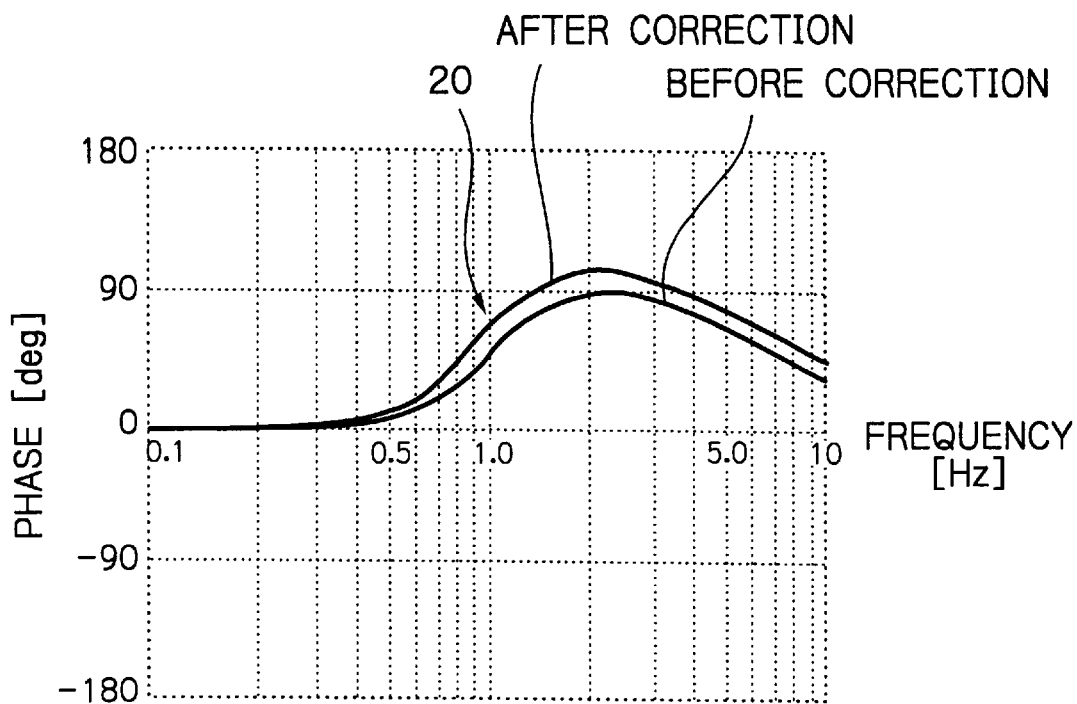
FIG. 12 is a diagram concerning frequency-phase characteristics of a relative velocity estimation unit in FIG. 9, comparatively showing the difference in frequency-phase characteristics when correction is made by a time constant determination unit and when it is not.
Figure 13:
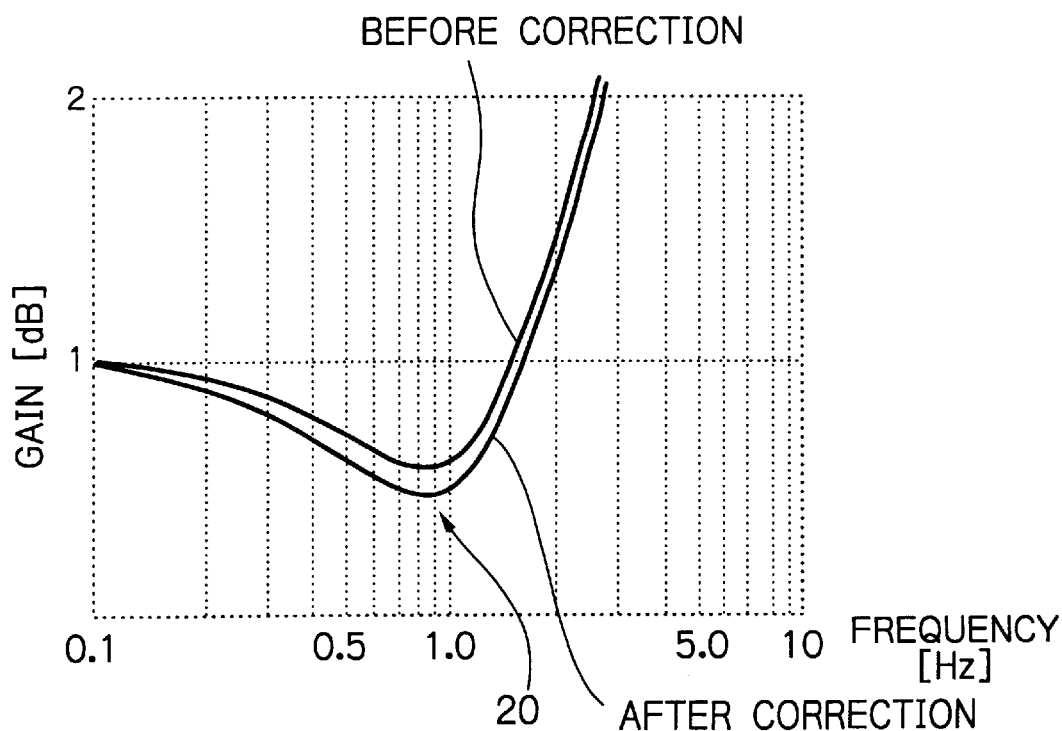
FIG. 13 is a diagram concerning frequency-gain characteristics of the relative velocity estimation unit in FIG. 9, comparatively showing the difference in frequency-gain characteristics when corrected is made by the time constant determination unit and when it is not.

In the second embodiment arranged as stated above, if the vehicle weight P1 exceeds the vehicle weight reference value P0 (if YES is the answer at step S10), the values of the time constants T1, T2, T3 and T4 are determined by processing at step S11, whereby, as shown by the curve "After Correction) in FIG. 13, the gain D of the signal D (corresponding to the estimated relative velocity) in the neighborhood of the sprung mass resonance frequency becomes smaller than in the case of "Before Correction", and, as shown by the curve "After Correction" in FIG. 12, the phase of the vertical acceleration M becomes larger (advanced) than in the case of "Before Correction".

As has been stated above, when the vehicle weight P1 exceeds the vehicle weight reference value P0, the gain D of the applicable, estimated relative velocity (signal D) decreases, and the phase of the vertical acceleration M increases (advances) in the high frequency regions. Consequently, the corrected signal E obtained in the divider circuit 9 using the signal D as a denominator, i.e. the command current I (i.e. a signal directly influencing the final desired damping force) increases in value, and the phase of the vertical acceleration M is made, in effect, coincident with the phase of the absolute velocity and hence possible to achieve an improvement in ride quality.

Further, because the command current I (i.e. a signal directly influencing the final desired damping force) is increased when the vehicle weight P1 exceeds the vehicle weight reference value P0, it is possible to rapidly cope with a deficiency in damping force due to a change in weight to thereby improve ride quality.

Further, the time constants T1, T2, T3 and T4 of the relative velocity estimation unit 16 and hence the filter constants (gain and phase) [adjusting parameters for the acceleration M] are variable. Therefore, the controlled variable (command current I) can be changed by varying the time constants T1, T2, T3 and T4. Thus, it is possible to ensure damping characteristic control of high accuracy. It should be noted that this holds true for the following third to fifteenth embodiments.

Further, in the neighborhood of vehicle body resonance point 20, the gain D of the applicable, estimated relative velocity (signal D) decreases, whereas in frequency regions other than the neighborhood of vehicle body resonance point 20, the gain D of the estimated relative velocity (signal D) increases, as in the case of the first embodiment. Accordingly, the controlled variable in the neighborhood of vehicle body resonance point 20 increases. Thus, it is possible to improve ride quality in the neighborhood of vehicle body resonance point (1 Hz).

In the second embodiment, the vehicle weight P1 detected with the sprung mass sensor 17 is judged (step S10) by using a single vehicle weight reference value P0. However, the arrangement may be such that the judgment is made by using a plurality of different vehicle weight reference values, and the determination of time constants [hence the change of the gain and phase (adjusting parameters)] is made so that the time constants assume different values according to the result of the judgment. With this arrangement, control characteristics of high accuracy can be attained.

The arrangement may also be such that a variable vehicle weight reference value is used in place of a single vehicle weight reference value P0 as stated above, and the vehicle weight reference value is varied by a manual operation or automatically according to circumstances, for example, whether or not a little child is included among the occupants of the vehicle, or according to the surface condition of the road on which the vehicle is about to run.

Figure 37:
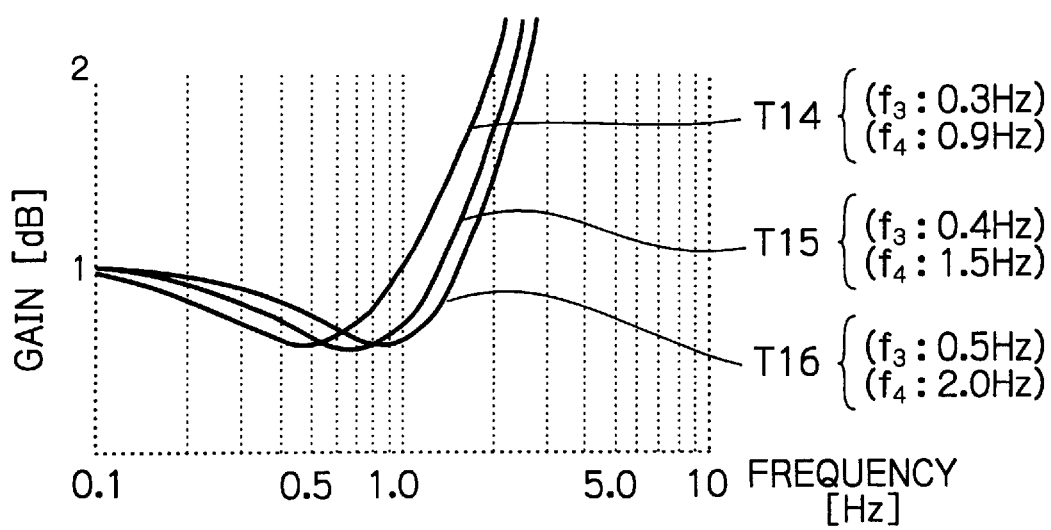
FIG. 37 is a diagram showing frequency-gain characteristics corresponding to various vehicle weights.

In this embodiment, the frequency-gain characteristics of the relative velocity estimation unit 16 are determined according to the vehicle weight as follows:

(1) When the vehicle weight is standard (the number of occupants is two), the time constants are determined so that the frequency-gain characteristics are as shown by the segment T16 in FIG. 37. In this case, for the time constant $T3=1/(2\pi f3)$, f3 is set equal to 0.5 Hz, and for the time constant $T4=1/(2\pi f4)$, f4 is set equal to 2.0 Hz.

(2) When the vehicle weight is equivalent to that in a case where the number of occupants is four, the time constants are determined so that the frequency-gain characteristics are as shown by the segment T15 in FIG. 37. In this case, for the time constant $T3=1/(2\pi f3)$, f3 is set equal to 0.4 Hz, and for the time constant $T4=1/(2\pi f4)$, f4 is set equal to 1.5 Hz.

(3) When the vehicle weight is equivalent to the sum of the total weight of four occupants and the weight of baggage, the time constants are determined so that the frequency-gain characteristics are as shown by the segment T14 in FIG. 37. In this case, for the time constant $T3=1/(2\pi f3)$, f3 is set equal to 0.3 Hz, and for the time constant $T4=1/(2\pi f4)$, f4 is set equal to 0.9 Hz.

In the second embodiment, the sprung mass sensor 17 is provided to detect the vehicle weight P1 (sprung mass), and the vehicle weight P1 is used for the judgment (step S10) to determine the time constants [and hence change the gain and phase (adjusting parameters)]. However, the arrangement may be such that the rate of change in the vehicle weight P1 (vehicle weight change rate) is obtained, and the vehicle weight change rate is compared with a predetermined vehicle weight change rate reference value to make a judgment to determine the time constants [and hence change the gain and phase (adjusting parameters)].

With the above-described arrangement, it is possible to rapidly cope with a deficiency in damping force due to a change in the sprung mass to thereby improve ride quality.

In the second embodiment, the vehicle weight P1 (sprung mass) detected with the sprung mass sensor 17 is used, by way of example. However, the suspension control system may be arranged to use, in place of the vehicle weight P1, information detected with a seat switch (a change in vehicle weight of approximately 50 to 60 kg can be judged from the on-off switching operation of a seat switch), the pressure in an air suspension system, the pressure in the cylinder of a shock absorber, the measured value of a gasoline gauge, or information as to whether or not an occupant fastens a seat belt (a change in vehicle weight of approximately 50 to 60 kg can be judged from fastening or unfastening of a seat belt).

Next, a third embodiment of the present invention will be described with reference to FIGS. 14 to 18. It should be noted that illustration and description of members or portions equivalent to those in the first and second embodiments (FIGS. 1 to 13) are omitted according to circumstances.

Figure 14:
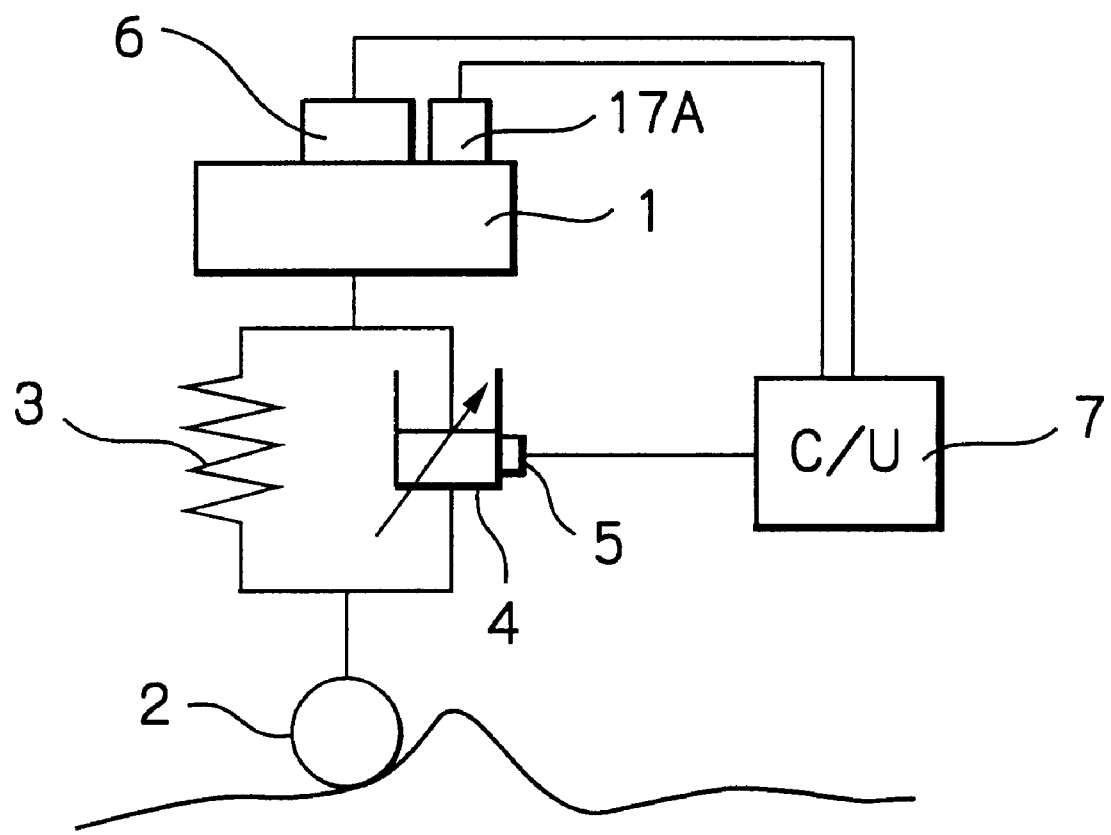
FIG. 14 is a diagram schematically showing a suspension control system according to a third embodiment of the present invention.
Figure 15:
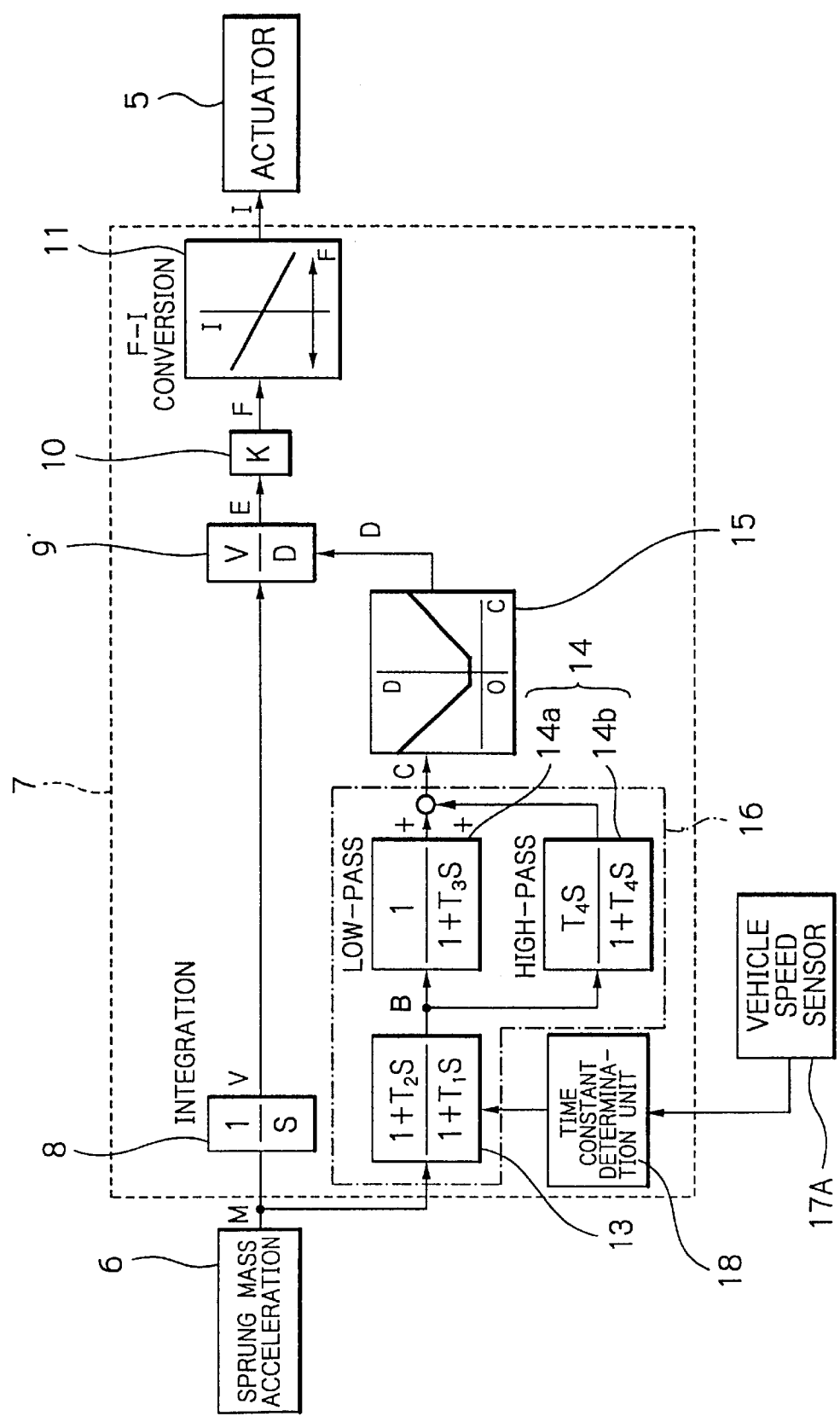
FIG. 15 is a block diagram schematically showing the arrangement of a controller used in the suspension control system shown in FIG. 14.
Figure 16:
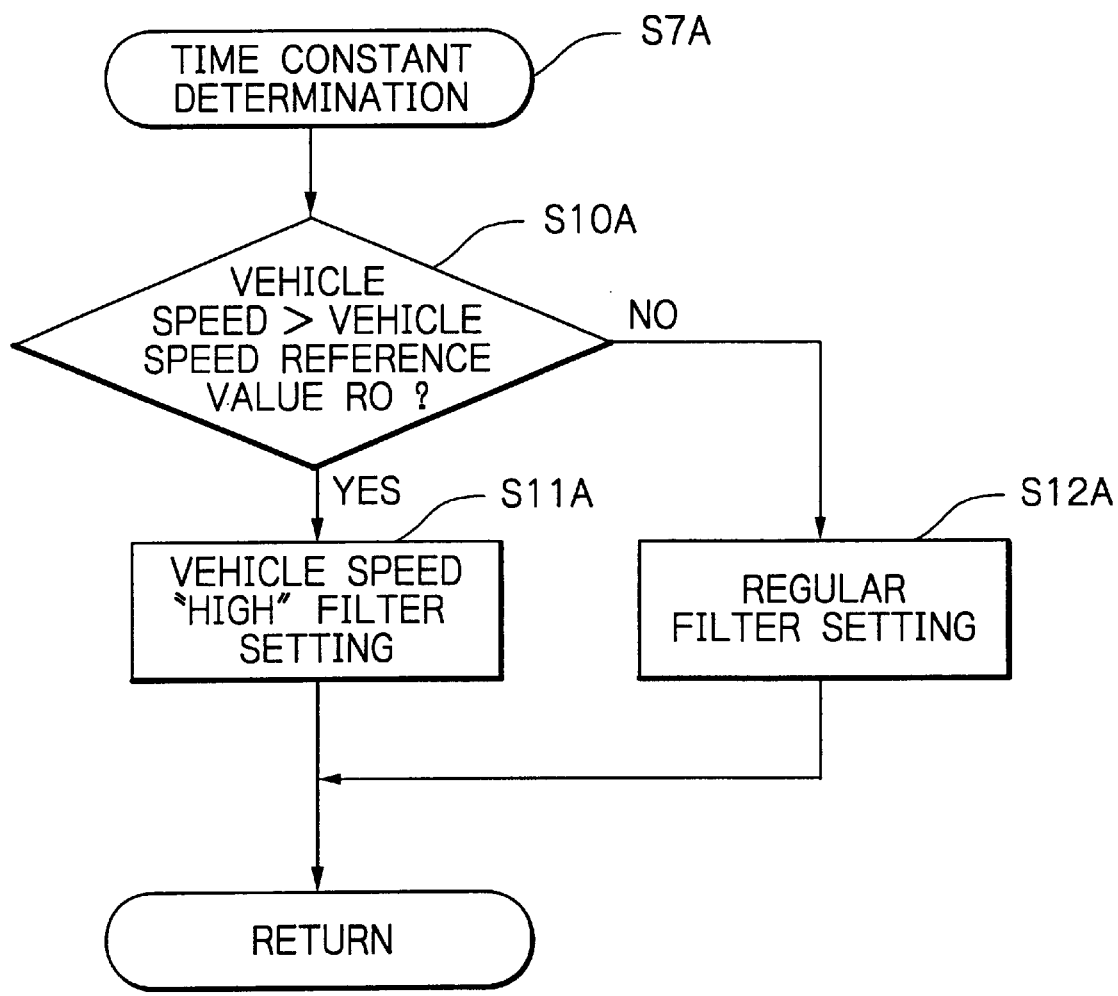
FIG. 16 is a flowchart showing a time constant determination subroutine executed by the controller shown in FIG. 15.

The third embodiment differs from the second embodiment mainly in the following points. As shown in FIGS. 14 and 15, a vehicle speed sensor 17A for detecting the vehicle speed R1 by obtaining the rotational speed of the wheel is provided in place of the sprung mass sensor 17. In addition, a time constant determination subroutine (step S7A) shown in FIG. 16 is provided in place of the time constant determination subroutine (step S7) shown in FIGS. 10 and 11. Thus, the vehicle speed R1 is used to determine the time constants in place of the vehicle weight P1. It should be noted that a vehicle speed reference value to be compared with the vehicle speed R1 has previously been stored in the controller 7.

At step S7A (time constant determination subroutine), as shown in FIG. 16, the controller 7 judges whether or not the vehicle speed R1 exceeds the vehicle speed reference value R0 (step S10A). If it is judged at step S10A that the vehicle speed R1 exceeds the vehicle speed reference value R0 (YES), the controller 7 executes the operation at step S11A. At step S11A, the controller 7 determines the values of the time constants T1, T2, T3 and T4 so that the following condition will be obtained, and then returns to the main routine shown in FIG. 10. That is, the values of the time constants T1, T2, T3 and T4 are determined so that, as shown by the curve "After Correction" in FIG. 18, the gain D of the signal C and thus the signal D (corresponding to the estimated relative velocity) becomes smaller than in the case of "Before Correction" in FIG. 18 as a whole and particularly smaller in the neighborhood of vehicle body resonance point 20 (i.e. in the neighborhood of sprung mass resonance frequency), and, as shown by the curve "After correction" in FIG. 17, the phase of the vertical acceleration M becomes larger (advanced) than in the case of "Before Correction" in FIG. 17 in the neighborhood of vehicle body resonance point 20 and in frequency regions higher than the resonance point 20.

If it is judged at step S10A that the vehicle speed R1 is not in excess of the vehicle speed reference value R0 (NO), the controller 7 determines the values of the time constants T1, T2, T3 and T4 so that the gain D of the signal D (corresponding to the estimated relative velocity) in the neighborhood of the sprung resonance frequency becomes large (step S12A), and then returns to the main routine shown in FIG. 10.

Figure 17:
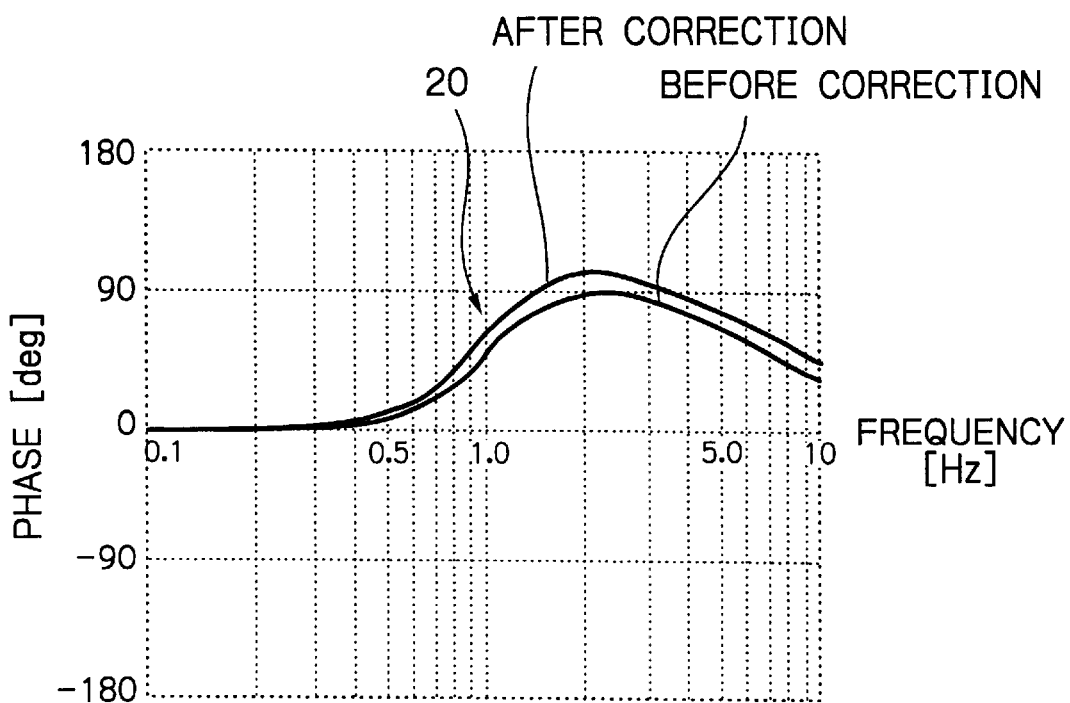
FIG. 17 is a diagram concerning frequency-phase characteristics of a relative velocity estimation unit in FIG. 15, comparatively showing the difference in frequency-phase characteristics when correction is made by a time constant determination unit and when it is not.
Figure 18:
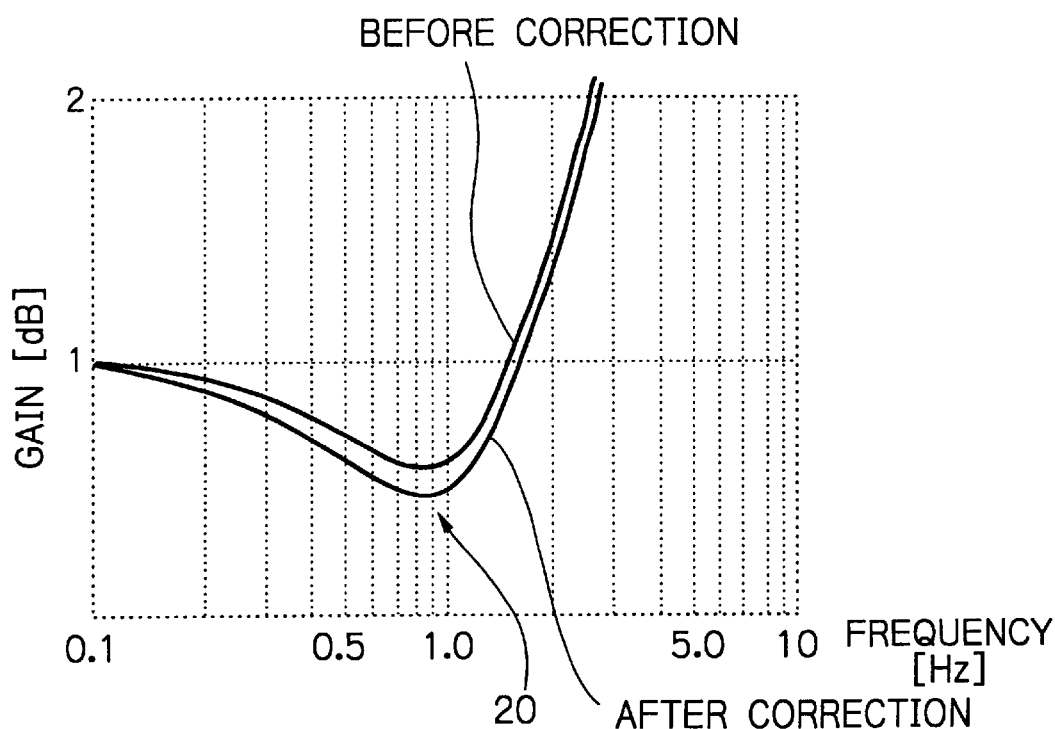
FIG. 18 is a diagram concerning frequency-gain characteristics of the relative velocity estimation unit in FIG. 15, comparatively showing the difference in frequency-gain characteristics when corrected is made by the time constant determination unit and when it is not.

In the third embodiment arranged as stated above, if the vehicle speed R1 exceeds the vehicle speed reference value R0 (if YES is the answer at step S10A), the values of the time constants T1, T2, T3 and T4 are determined by processing at step S11A, whereby, as shown by the curve "After Correction) in FIG. 18, the gain D of the signal D (corresponding to the estimated relative velocity) in the neighborhood of the sprung mass resonance frequency becomes smaller than in the case of "Before Correction", and, as shown by the curve "After Correction" in FIG. 17, the phase of the vertical acceleration M becomes larger (advanced) than in the case of "Before Correction".

As has been stated above, when the vehicle speed R1 exceeds the vehicle speed reference value R0, the gain D of the applicable, estimated relative velocity (signal D) decreases, and the phase of the vertical acceleration M increases (advances) in the high frequency regions. Consequently, the corrected signal E obtained in the divider circuit 9 using the signal D as a denominator, i.e. the command current I (i.e. a signal directly influencing the final desired damping force) increases in value, and the phase of the vertical acceleration M is made, in effect, coincident with the phase of the absolute, velocity and hence possible to achieve an improvement in ride quality.

Further, because the command current I (i.e. a signal directly influencing the final desired damping force) is increased when vehicle speed R1 exceeds the vehicle speed reference value R0, it is possible to rapidly cope with a deficiency in damping force due to a change in vehicle speed to thereby improve ride quality.

Further, in the neighborhood of vehicle body resonance point 20, the gain D of the applicable estimated relative velocity (signal D) decreases, whereas in frequency regions other than the neighborhood of vehicle body resonance point 20, the gain D of the estimated relative velocity (signal D) increases, as in the case of the first embodiment. Accordingly, the controlled variable in the neighborhood of vehicle body resonance point 20 increases. Thus, it is possible to improve ride quality in the neighborhood of vehicle body resonance point (1 Hz).

Figure 22:
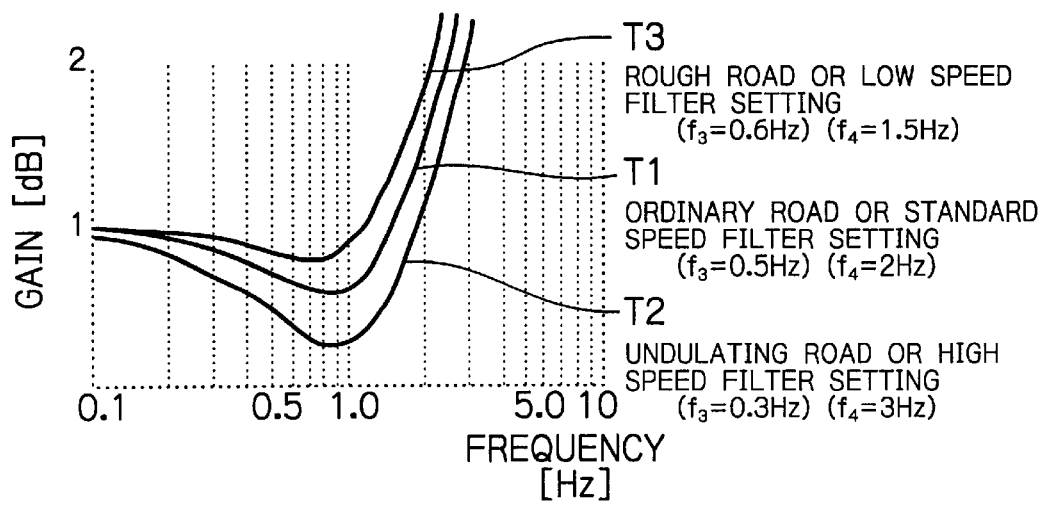
FIG. 22 is a diagram showing frequency-gain characteristics varying in accordance with the change in frequency in a relative velocity estimation unit of the controller shown in FIG. 19.

In the third embodiment, the vehicle speed R1 detected with the vehicle speed sensor 17A is judged (step S10A) by using a single vehicle speed reference value R0. However, the arrangement may be such that the judgment is made by using a plurality of different vehicle speed reference values, and the determination of time constants [hence the change of the gain and phase (adjusting parameters)] is made so that the time constants assume different values according to the result of the judgment. With this arrangement, control characteristics of high accuracy can be attained. An example of this arrangement, in which two reference values are used, will be described below. In this example, the frequency-gain characteristics of the relative velocity estimation unit 16 are determined according to the vehicle speed as follows:

(1) When the vehicle speed is standard (50 to 80 km/h), the time constants are determined so that the frequency-gain characteristics are as shown by the segment T1 in FIG. 22. In this embodiment, for the time constant $T3=1/(2\pi f3)$, f3 is set equal to 0.5 Hz, and for the time constant $T4=1/(2\pi f4)$, f4 is set equal to 2.0 Hz.

(2) When the vehicle speed is high (higher than 80 km/h), the time constants are determined so that the frequency-gain characteristics are as shown by the segment T2 in FIG. 22. In this embodiment, for the time constant $T3=1/(2\pi f3)$, f3 is set equal to 0.3 Hz, and for the time constant $T4=1/(2\pi f4)$, f4 is set equal to 3.0 Hz.

(3) When the vehicle speed is low (lower than 50 km/h), the time constants are determined so that the frequency-gain characteristics are as shown by the segment T3 in FIG. 22. In this case, the time constants may be determined so that the frequency-gain characteristics are as shown by the segment T1 in FIG. 22. When the time constants are determined so that the frequency-gain characteristics are as shown by the segment T3, in this embodiment, for the time constant $T3=1/(2\pi f3)$, f3 is set equal to 0.6 Hz, and for the time constant $T4=1/(2\pi f4)$, f4 is set equal to 1.5 Hz.

In the third embodiment, the vehicle speed sensor 17A is provided to detect the vehicle speed R1, and the vehicle speed R1 is used for the judgment (step S10A) to determine the time constants [and hence change the gain and phase (adjusting parameters)]. However, the arrangement may be such that the rate of change in the vehicle speed R1 (vehicle speed change rate) [acceleration] is obtained, and the vehicle speed change rate [acceleration] is compared with a predetermined vehicle speed change rate reference value to make a judgment to determine the time constants [and hence change the gain and phase (adjusting parameters)].

With the above-described arrangement, it is possible to rapidly cope with a deficiency in damping force when the vehicle is running at high speed to thereby improve ride quality.

In the third embodiment, the vehicle speed sensor 17A detects the vehicle speed by obtaining the rotational speed of the wheel, by way of example. However, the vehicle speed sensor 17A may be replaced with a device for detecting the vehicle speed by using information obtained from GPS or combined information consisting of the engine speed and the gear position (1st gear, 2nd, etc.).

As has been stated above, when the vehicle speed R1 exceeds the vehicle speed reference value R0, the gain D of the applicable estimated relative velocity (signal D) decreases, and the phase of the vertical acceleration M increases (advances) in the high frequency regions. Consequently, the corrected signal E obtained in the divider circuit 9 using the signal D as a denominator, i.e. the command current I (i.e. a signal directly influencing the final desired damping force) increases in value, and the phase of the vertical acceleration M is made, in effect, coincident with the phase of the absolute velocity and hence possible to achieve an improvement in ride quality.

Further, because the command current I (i.e. a signal directly influencing the final desired damping force) is increased when the vehicle speed R1 exceeds the vehicle speed reference value R0, it is possible to rapidly cope with a deficiency in damping force due to a change in vehicle speed to thereby improve ride quality.

Next, a fourth embodiment of the present invention will be described with reference to FIGS. 19 to 22. It should be noted that illustration and description of members or portions equivalent to those in the first to third embodiments (FIGS. 1 to 18) are omitted according to circumstances.

Figure 19:
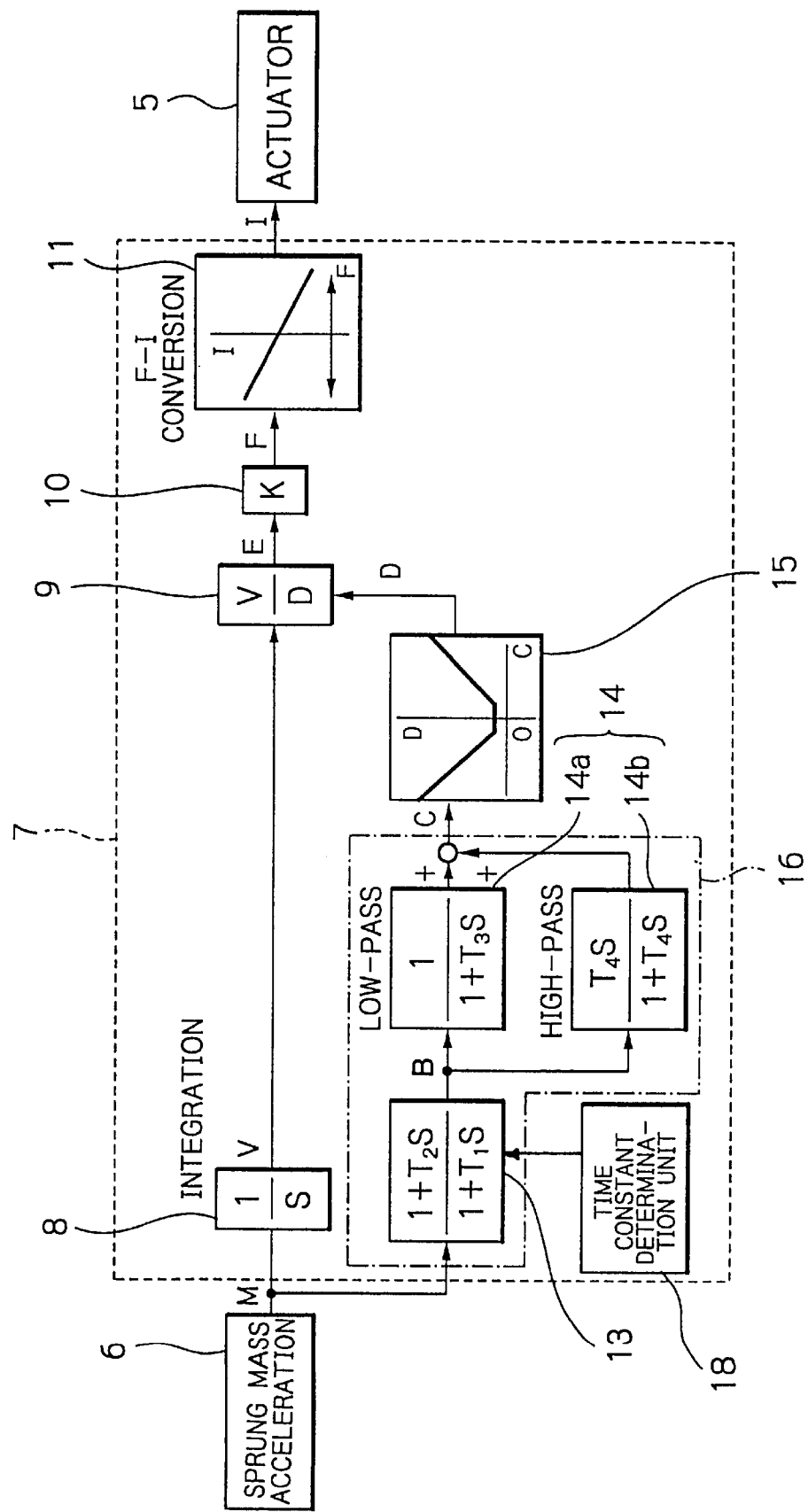
FIG. 19 is a block diagram schematically showing the arrangement of a controller used in a suspension control system according to a fourth embodiment of the present invention.

The fourth embodiment differs from the second embodiment mainly in the following points (a) to (d):

(a) As shown in FIG. 19, the sprung mass sensor 17 is not used.

(b) The time constant determination unit 18 provided in the controller 7 is supplied as an input with the acceleration M (detected signal) from the acceleration sensor 6 (sprung mass vibration detecting device) and judges the road surface condition as stated later.

(c) The controller 7 adjusts the phase of the acceleration M from the acceleration sensor 6 on the basis of the filter constants (gain and phase) [adjusting parameters for the acceleration M] of the relative velocity estimation unit 16 and changes the filter constants (gain and phase) by determining the values of the time constants T1, T2, T3 and T4 according to the result of the judgment on the road surface condition.

Figure 20:
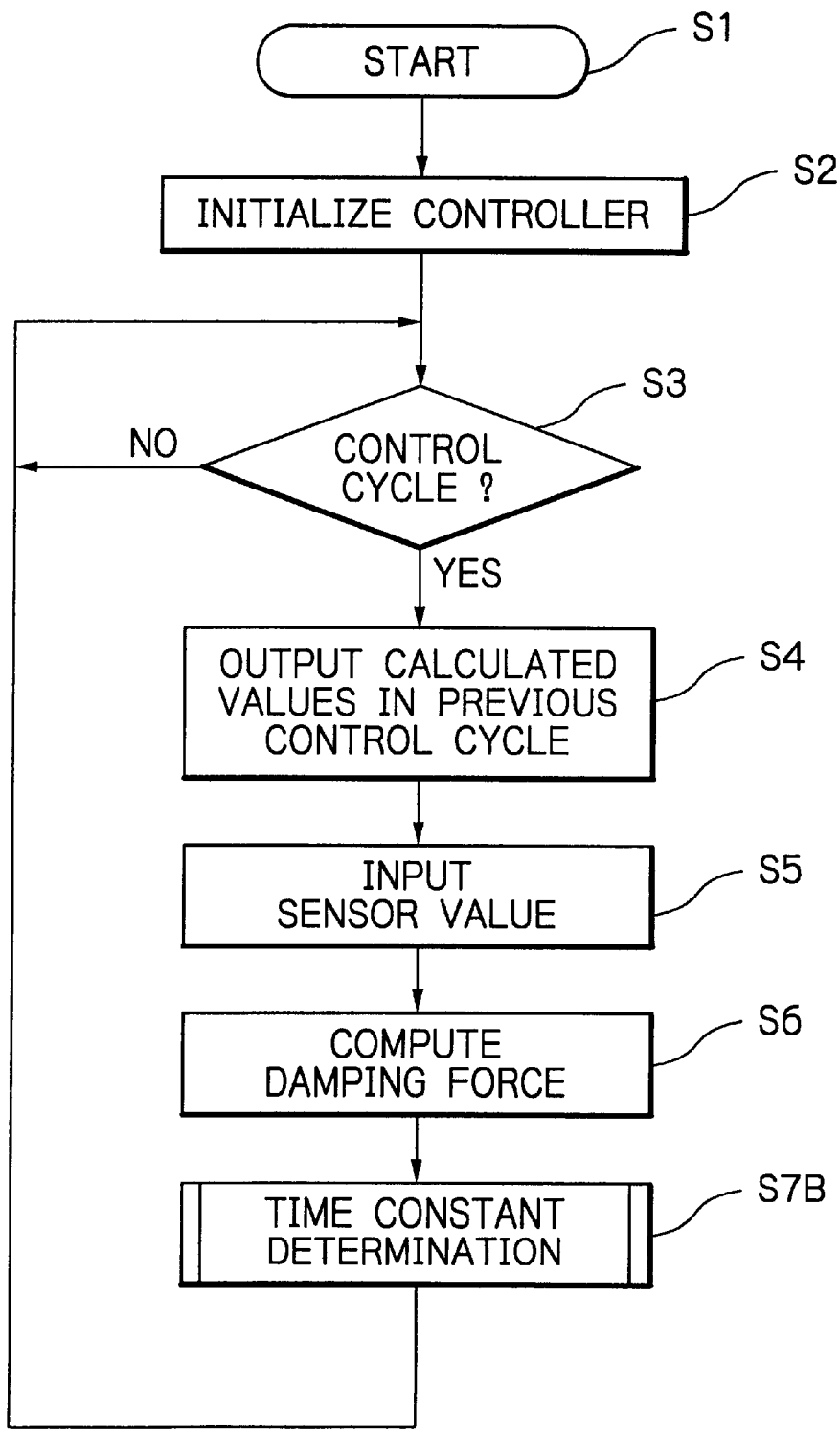
FIG. 20 is a flowchart showing a main routine executed by the controller shown in FIG. 19.
Figure 21:
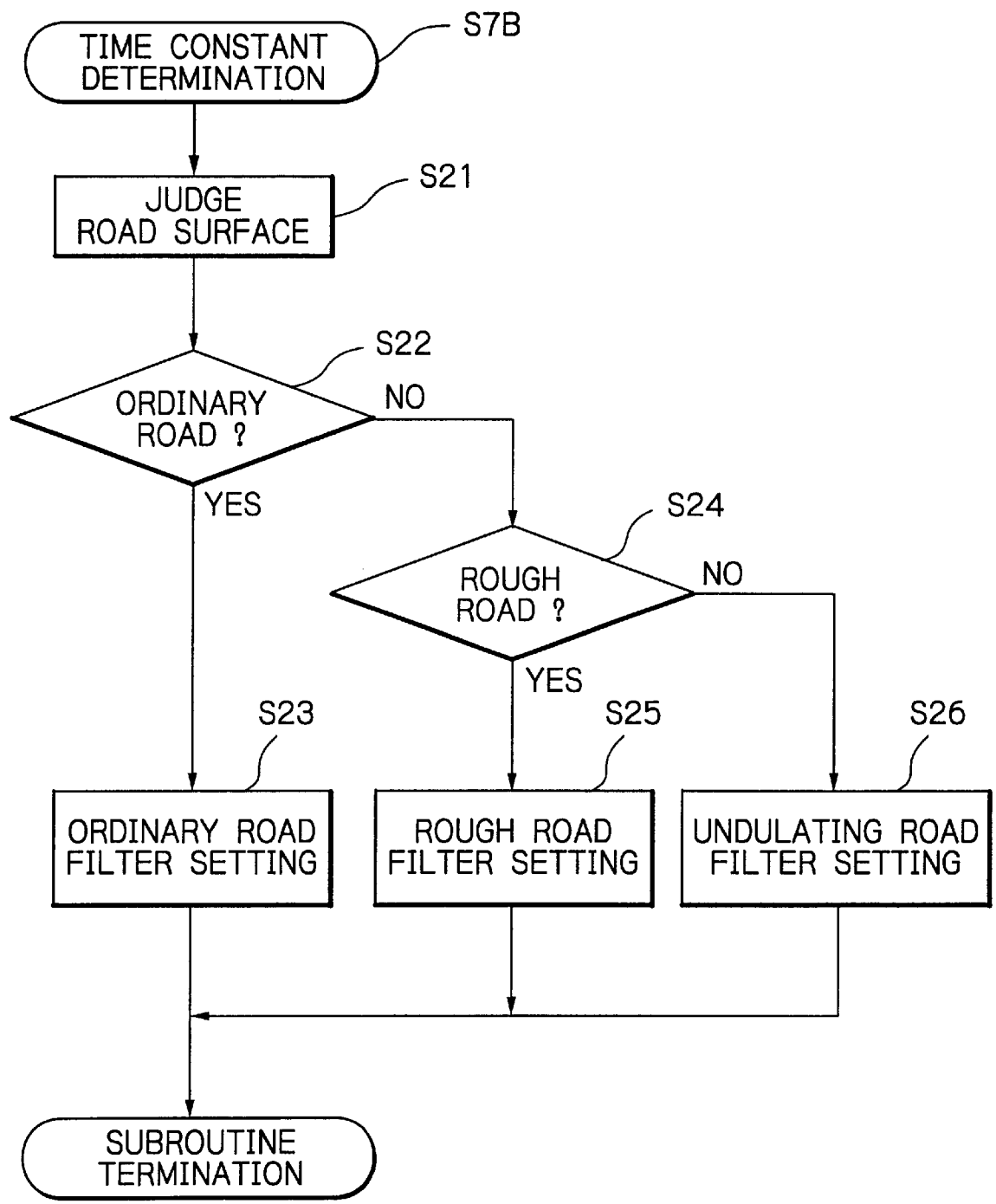
FIG. 21 is a flowchart showing a time constant determination subroutine in FIG. 20.

(d) A time constant determination subroutine (step S7B) shown in FIGS. 20 and 21 is provided in place of the time constant determination subroutine (step S7) shown in FIGS. 10 and 11.

The controller 7 has an ordinary road reference value and a rough road reference value stored therein in advance for comparison with the acceleration M detected with the acceleration sensor 6 (sprung mass vibration detecting device). The controller 7 executes a comparative operation using the ordinary road reference value and the rough road reference value as stated later to judge the road surface condition to be "ordinary road" or "rough road" according to the acceleration M. The judgment on the road surface condition is made by using the amplitude and vibration period (frequency) of the acceleration M.

At step S7B (time constant determination subroutine), as shown in FIG. 21, the controller 7 executes an operation (step S21) for judging the road surface condition, such as extraction of the amplitude and vibration period of the acceleration M, and judges whether or not the road surface condition is "ordinary road" (step S22) on the basis of the information (acceleration M) obtained at step S21.

If it is judged at step S22 that the road surface condition is "ordinary road" (YES), the controller 7 executes the operation at step S23 and then returns to the main routine shown in FIG. 20.

If it is judged at step S22 that the road surface condition is not "ordinary road" (NO), the controller 7 judges whether or not the road surface condition is "rough road" (step S24).

If the road surface condition is judged to be "rough road" (i.e. the low-frequency component of the acceleration M is large) (YES) at step S24, the controller 7 executes the operation at step S25 and then returns to the main routine shown in FIG. 20.

If it is judged at step S24 that the road surface condition is not "rough road" (NO), the controller 7 executes the operation at step S26 and then returns to the main routine shown in FIG. 20.

At step S23, the filter constants (gain and phase) of the relative velocity estimation unit 16 (i.e. the phase adjusting filter 13 and the gain adjusting filter 14) are set to an ordinary road filter state by changing the time constants.

At step S25, the filter constants of the relative velocity estimation unit 16 are similarly set to a rough road filter state by changing the time constants.

At step S26, the filter constants of the relative velocity estimation unit 16 are similarly set to an undulating road filter state by changing the time constants.

The setting of the ordinary road filter state at step S23 is effected by determining the values of the time constants T1, T2, T3 and T4 so that the gain D of the signal C and thus the signal D (corresponding to the estimated relative velocity) becomes small in the neighborhood of vehicle body resonance point 20 (i.e. in the neighborhood of sprung mass resonance frequency) as shown by the segment T1 in FIG. 22. In this case, for the time constant $T3=1/(2\pi f3)$, f3 is set equal to 0.5 Hz, and for the time constant $T4=1/(2\pi f4)$, f4 is set equal to 2.0 Hz.

The setting of the rough road filter state at step S25 is effected by determining the values of the time constants T1, T2, T3 and T4 so that the gain D of the signal C and thus the signal D (corresponding to the estimated relative velocity) becomes larger than the segment T1 (ordinary road filter state) in all the frequency regions, including the neighborhood of vehicle body resonance point 20 (i.e. the neighborhood of sprung mass resonance frequency) as shown by the segment T3 in FIG. 22. In this case, for the time constant $T3=1/(2\pi f3)$, f3 is set equal to 0.6 Hz, and for the time constant $T4=1/(2\pi f4)$, f4 is set equal to 1.5 Hz.

The setting of the undulating road filter state at step S26 is effected by determining the values of the time constants T1, T2, T3 and T4 so that the gain D of the signal C and thus the signal D (corresponding to the estimated relative velocity) becomes smaller than the segment T1 (ordinary road filter state) in all the frequency regions, including the neighborhood of vehicle body resonance point 20 (i.e. the neighborhood of sprung mass resonance frequency) as shown by the, segment T2 in FIG. 22. In this case, for the time constant $T3=1/(2\pi f3)$, f3 is set equal to 0.3 Hz, and for the time constant $T4=1/(2\pi f4)$, f4 is set equal to 3.0 Hz.

In the fourth embodiment arranged as stated above, when the road surface condition is judged to be "rough road", the setting of the rough road filter state is executed (step S25), and the values of the time constants T1, T2, T3 and T4 are determined [and hence the magnitudes of the gain and phase (adjusting parameters) are adjusted] as stated above. Consequently, the gain D of the signal C and thus the signal D (corresponding to the estimated relative velocity) becomes larger than the segment T1 (ordinary road filter state) as shown by the segment T3 in FIG. 22. Accordingly, the corrected signal E obtained in the divider circuit 9 using the signal D as a denominator, i.e. the command current I (i.e. a signal directly influencing the final desired damping force) decreases in value, and it becomes possible to achieve an improvement in ride quality.

When the road surface condition is judged to be "undulating road", the setting of the undulating road filter state is executed (step S26), and the values of the time constants T1, T2, T3 and T4 are determined [and hence the magnitudes of the gain and phase (adjusting parameters) are adjusted] as stated above. Consequently, the gain D of the signal D (corresponding to the estimated relative velocity) becomes smaller than the segment T1 (ordinary road filter state) as shown by the segment T2 in FIG. 22. Accordingly, the corrected signal E obtained in the divider circuit 9 using the signal D as a denominator, i.e. the command current I (i.e. a signal directly influencing the final desired damping force) increases in value, and it becomes possible to achieve an improvement in ride quality.

As has been stated above, the ordinary road filter state, the rough road filter state or the undulating road filter state is set according to the road surface condition (step S23 or step S26), and the values of the time constants T1, T2, T3 and T4 are determined [and hence the magnitudes of the gain and phase (adjusting parameters) are adjusted] as stated above. Therefore, the gain D of the signal D (corresponding to the estimated relative velocity) is adjusted according to the road surface condition. Accordingly, the command current I (i.e. a signal directly influencing the final desired damping force) is generated according to the result of the adjustment. Thus, suspension control is effected according to various road surface conditions, and it becomes possible to achieve an improvement in ride quality.

In the foregoing fourth embodiment, the acceleration M detected with the acceleration sensor 6 is used for judgment on the road surface condition, by way of example. However, the arrangement may be such that a vehicle height sensor or a non-contact road surface sensor is provided and information detected. with such a sensor is used for the road surface condition judgment instead of using the acceleration M as in the foregoing embodiment.

In the fourth embodiment, a judgment is made to distinguish between an ordinary road and a rough road, and the road surface condition is classified into one of "ordinary road", "rough road" and "undulating road", according to the result of the judgment. However, the road surface condition may be classified even more finely according to the result of the judgment to further improve the control accuracy.

In the fourth embodiment, the road surface condition is judged on the basis of the acceleration M detected with the acceleration sensor 6, and the values of the time constants T1, T2, T3 and T4 [and hence the filter constants (gain and phase)] are adjusted according to the result of the judgment, by way of example. However, the arrangement may be such that an acceleration sensor (not shown) is provided in addition to the acceleration sensor 6 to detect the condition of change in the attitude of the vehicle, i.e. pitching, bouncing and rolling of the vehicle, and information detected with the acceleration sensor 6 and another accelerations sensor (not shown) is divided into a plurality of modes. Thus, the values of the time constants T1, T2, T3 and T4 [and hence the filter constants (gain and phase)] are adjusted according to the detected mode.

An example (a fifth embodiment of the present invention) in which the suspension control system is arranged as stated above will be described below with reference to FIG. 23. It should be noted that illustration and description of members or portions equivalent to those in the first to fourth embodiments (FIGS. 1 to 22) are omitted according to circumstances.

In the fifth embodiment, information detected with the acceleration sensor 6 and the other acceleration sensor (not shown) is classified into one of three modes, i.e. pitching, bouncing and rolling.

Figure 23:
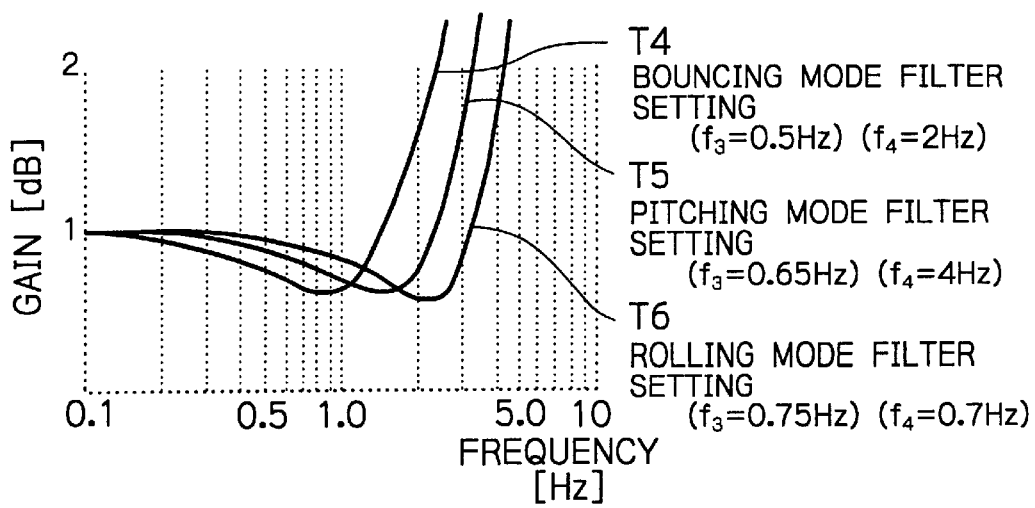
FIG. 23 is a diagram showing frequency-gain characteristics varying in accordance with the change in a relative velocity estimation unit in a fifth embodiment of the present invention.

For the bouncing, pitching and rolling modes, the values of the time constants T1, T2, T3 and T4 are determined so as to provide frequency-gain characteristics represented by the segment T4, T5 or T6 in FIG. 23, i.e. so that, in each mode, the gain takes smallest value at the resonance frequency.

In this case, the resonance frequencies of the bouncing, pitching and rolling modes become higher in the order mentioned. In the bouncing mode (segment T4), the values of the time constants T1, T2, T3 and T4 are determined so that in frequency regions lower than the resonance frequency, the gain is smaller than in the other modes, whereas in frequency regions higher than the resonance frequency, the gain is larger than in the other modes.

In the pitching mode (segment T5), the values of the time constants T1, T2, T3 and T4 are determined so that in frequency regions lower than the resonance frequency, the gain characteristic curve lies between those of the other modes, and also in frequency regions higher than the resonance frequency, the gain characteristic curve lies between those of the other modes.

In the fifth embodiment arranged as stated above, information detected with the acceleration sensor 6 and another acceleration sensor (not shown) is classified into one of the bouncing, pitching and rolling modes, and the values of the time constants T1, T2, T3 and T4 are determined according to the detected mode, i.e. one of the bouncing, pitching and rolling modes so that the gain in the neighborhood of the resonance frequency is made small.

Accordingly, when the bouncing, pitching or rolling mode is detected, the values of the time constants T1, T2, T3 and T4 are determined [and hence the magnitudes of the gain and phase (adjusting parameters) are adjusted] so as to provide frequency-gain characteristics represented by the segment T4, T5 or T6 in FIG. 23, i.e. so that the gain at the resonance frequency of the bouncing, pitching or rolling mode becomes small. As a result, the corrected signal E obtained in the divider circuit 9 using the signal D as a denominator, i.e. the command current I (i.e. a signal directly influencing the final desired damping force) increases in value. Thus, it is possible to achieve an improvement in ride quality.

In the foregoing fifth embodiment, the values of the time constants T1, T2, T3 and T4 are fixed for each of the bouncing, pitching and rolling modes. However, the time constants may be varied in magnitude according to the vehicle speed or weight.

Next, a sixth embodiment of the present invention will be described with reference to FIGS. 24 to 28. It should be noted that illustration and description of members or portions equivalent to those in the first to fifth embodiments (FIGS. 1 to 23) are omitted according to circumstances.

Figure 24:
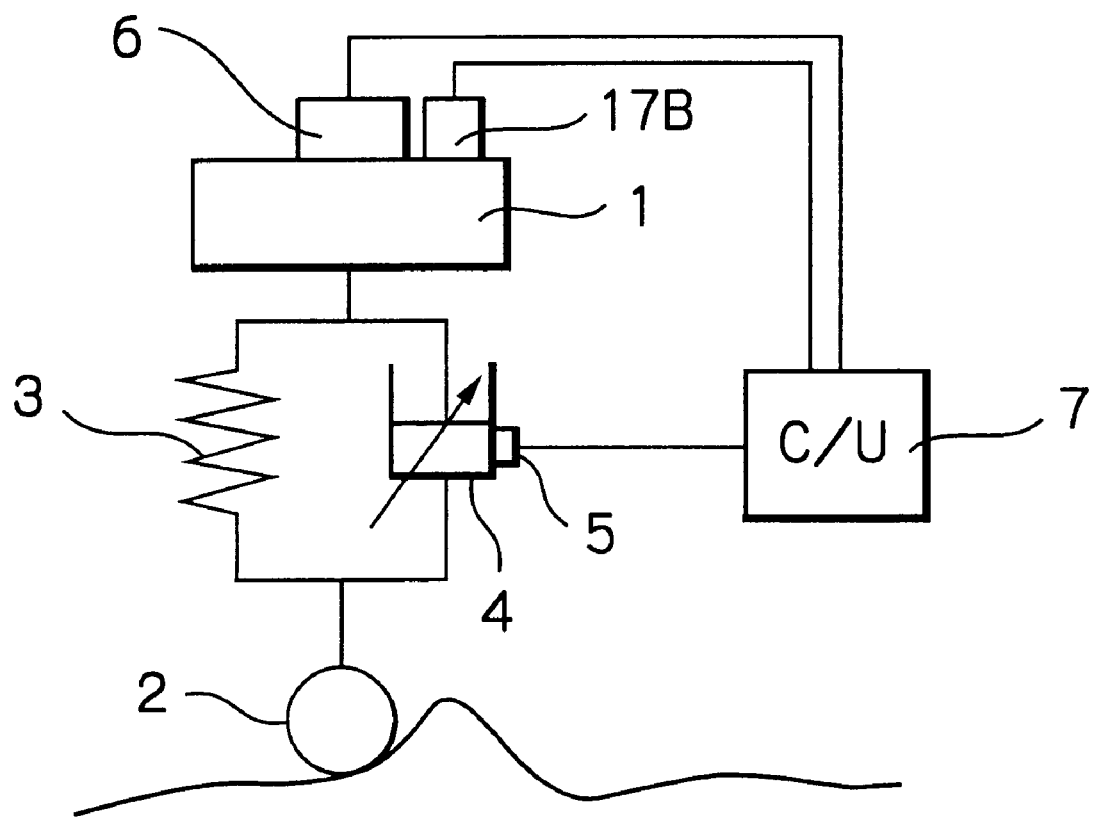
FIG. 24 is a diagram schematically showing a suspension control system according to a sixth embodiment of the present invention.
Figure 25:
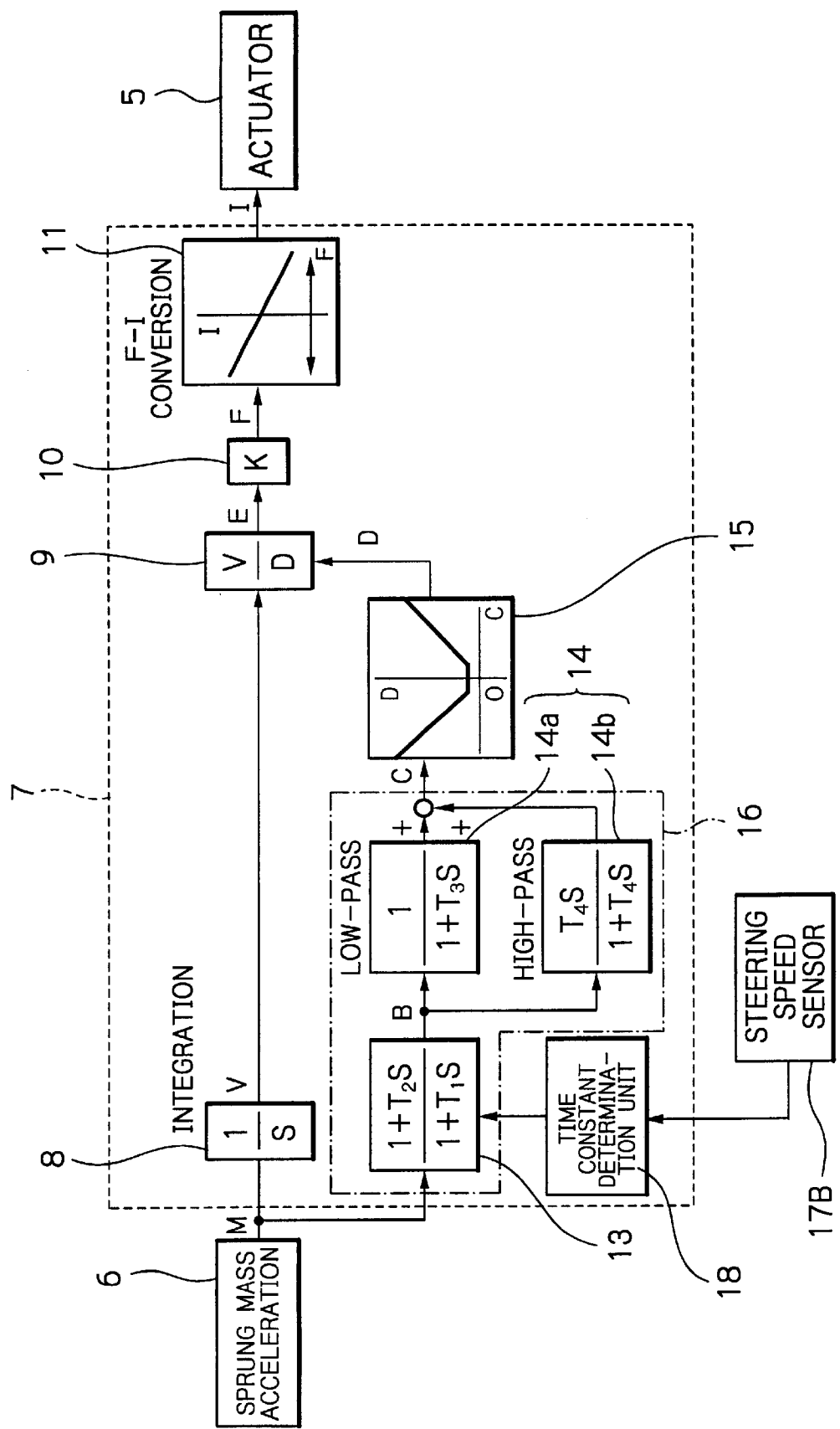
FIG. 25 is a block diagram schematically showing the arrangement of a controller used in the suspension control system shown in FIG. 24.

The sixth embodiment differs from the second embodiment mainly in the following points (a) to (c):

(a) As shown in FIGS. 24 and 25, a steering speed sensor 17B is provided in place of the sprung mass sensor 17 to detect the steering speed R11.

(b) The controller 7 adjusts the phase of the acceleration M (detected signal) from the acceleration sensor 6 on the basis of the filter constants (gain and phase) [adjusting parameters for the acceleration M] of the relative velocity estimation unit 16 and changes the filter constants (gain and phase) by determining the values of the time constants T1, T2, T3 and T4 according to the steering speed R11.

Figure 26:
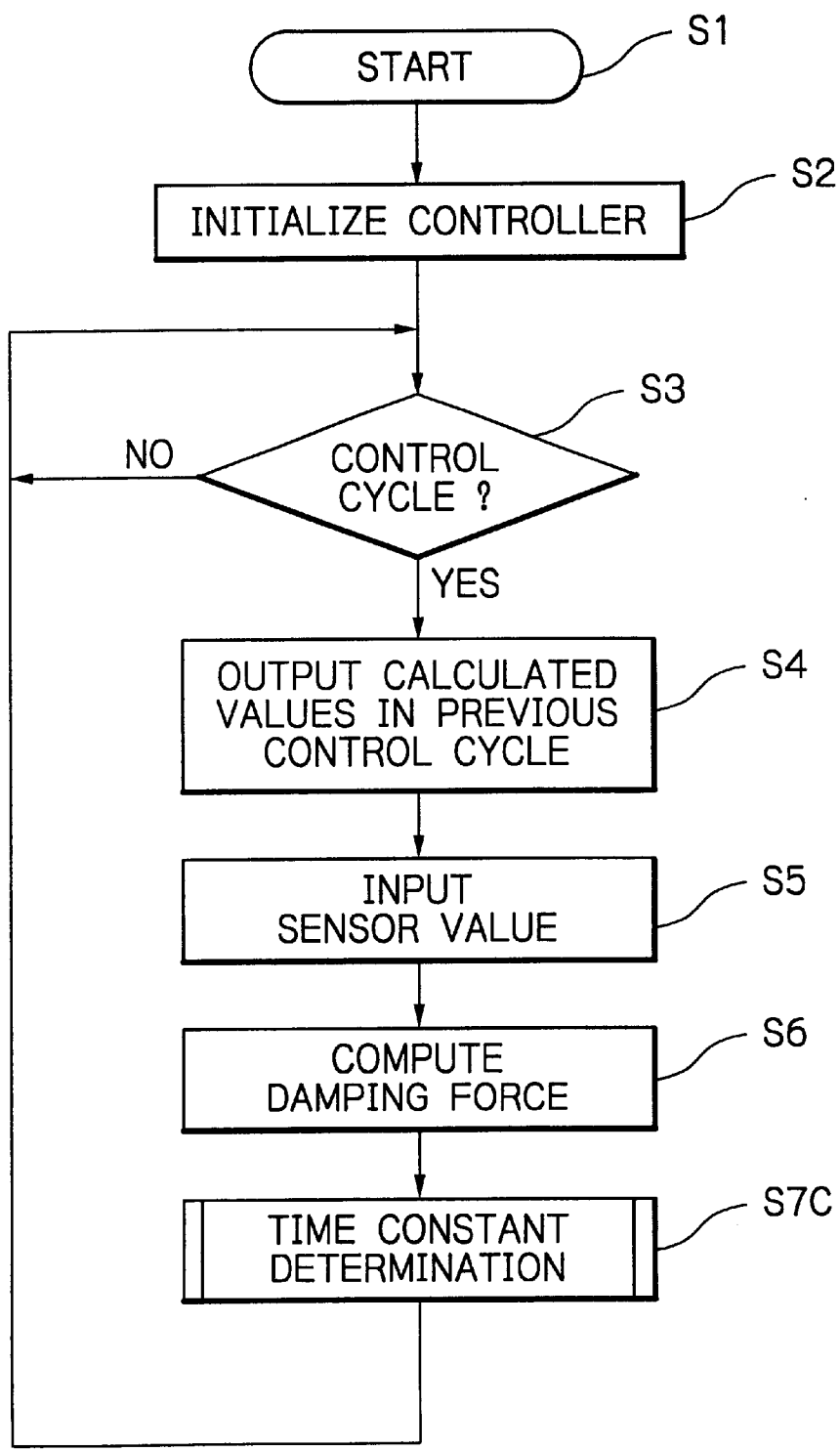
FIG. 26 is a flowchart showing a main routine executed by the controller used in the suspension control system shown in FIG. 24.
Figure 27:
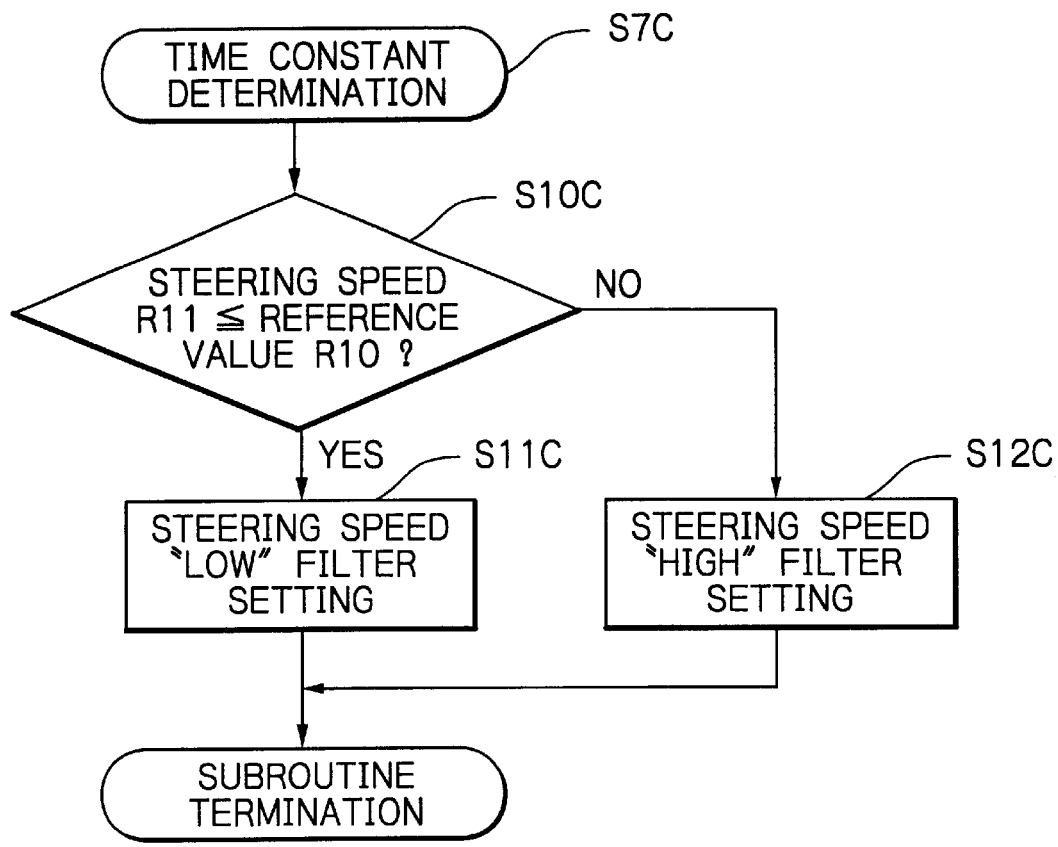
FIG. 27 is a flowchart showing a time constant determination subroutine in FIG. 26.

(c) A time constant determination subroutine (step S7C) shown in FIGS. 26 and 27 is provided in place of the time constant determination subroutine (step S7) shown in FIGS. 10 and 11.

The controller 7 has a steering speed reference value R10 stored therein in advance for comparison with the steering speed R11 detected with the steering speed sensor 17B, and executes a comparative operation using the steering speed reference value R10 as stated later. The contents of arithmetic control performed by the controller 7 will be described below with reference to FIGS. 26 and 27.

In FIG. 26, the controller 7 starts execution of control software as the power supply is turned on (step S1). First, the controller 7 executes initialization (step S2).

At step S7C (time constant determination subroutine), as shown in FIG. 27, the controller 7 judges whether or not the steering speed R11 is less than the steering speed reference value R10 (step S10C). If it is judged at step S10C that the steering speed R11 is less than the steering speed reference value R10 (YES), the controller 7 executes the operation at step S11C to effect steering speed "low" setting (segment T10), and then returns to the main routine shown in FIG. 26. If it is judged at step S10C that the steering speed R11 is not less than the steering speed reference value R10 (NO), the controller 7 executes the operation at step S12C to effect steering speed "high" setting (segment T11), and then returns to the main routine shown in FIG. 26.

Figure 28:
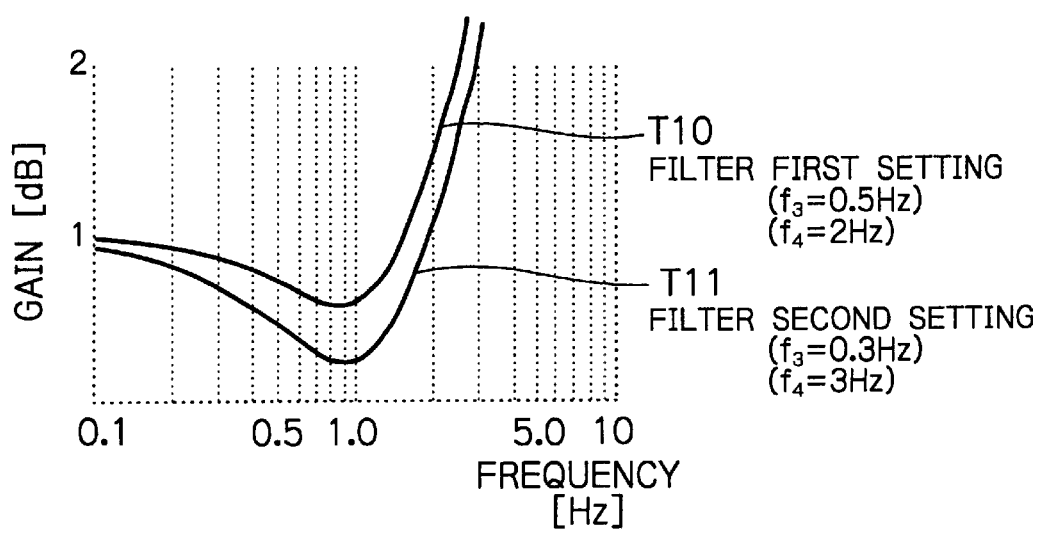
FIG. 28 is a diagram showing frequency-gain characteristics varying in accordance with the change in frequency at a relative velocity estimation unit of the controller shown in FIG. 25.

In the steering speed "low" setting operation (segment T10) at step S11C, the values of the time constants T1, T2, T3 and T4 are determined [and hence the magnitudes of the gain and phase (adjusting parameters) are adjusted] so that the gain D of the signal C and thus the signal D (corresponding to the estimated relative velocity) has a small value in the neighborhood of vehicle body resonance point 20 (i.e. in the neighborhood of sprung mass resonance frequency) as shown by the segment T10 in FIG. 28. In this case, for the time constant T3=1/(2πf3), f3 is set equal to 0.5 Hz, and for the time constant T4=1/(2πf4), f4 is set equal to 2.0 Hz.

In the steering speed "high" setting operation (segment T11) at step S12C, the values of the time constants T1, T2, T3 and T4 are determined[and hence the magnitudes of the gain and phase (adjusting parameters) are adjusted] so that the gain D of the signal C and thus the signal D (corresponding to the estimated relative velocity) has a small value in the neighborhood of vehicle body resonance point 20 (i.e. in the neighborhood of sprung resonance frequency) as shown by the segment T11 in FIG. 28. In the steering speed "high" setting operation (segment T11) at step S12C, the values of the time constants T1, T2, T3 and T4 are so determined that the gain is smaller than in the case of the steering speed "low" setting operation (segment T10) in the entire range at step S11C. In this case, for the time constant T3=1/(2πf3), f3 is set equal to 0.3 Hz, and for the time constant T4=1/(2πf4), f4 is set equal to 3.0 Hz.

In the sixth embodiment, when the steering speed R11 is less than the steering speed reference value R10, the filter first setting operation (segment T10) at step S11C is executed to determine the values of the time constants T1, T2, T3 and T4 [and hence adjust the magnitudes of the gain and phase (adjusting parameters)]. Accordingly, the gain D of the signal D (corresponding to the estimated relative velocity) becomes larger than the, segment T11 in the neighborhood of vehicle body resonance point 20 (i.e. in the neighborhood of sprung mass resonance frequency). Thus, it is possible to achieve an improvement in ride quality.

When the steering speed R11 is not less than the steering speed reference value R10, the filter second setting operation (segment T11) at step S12C is executed. As a result, the gain D of the signal D becomes smaller than in the case of the above-described step S11C in all the frequency regions. Accordingly, the controlled variable can be increased, and it is possible to improve steering stability and ride quality.

In the sixth embodiment, the filter constants of the relative velocity estimation unit 16 are changed in two steps, i.e. filter first setting and filter,second setting. However, the present invention is not necessarily limited to the described arrangement. The filter constants may be changed in three or more steps or continuously. This holds true for the following embodiments.

In the sixth embodiment, when the steering speed R11 is not less than the steering speed reference value R10, the values of the time constants T1, T2, T3 and T4 are determined [and hence the magnitudes of the gain and phase (adjusting parameters) are adjusted] so that the gain D of the signal D becomes smaller in all the frequency regions than in the case of the above-described step S11C (i.e. the steering speed R11 is less than the steering speed reference value R10), by way of example. However, the arrangement may be as shown in FIG. 29 (a seventh embodiment of the present invention).

Figure 29:
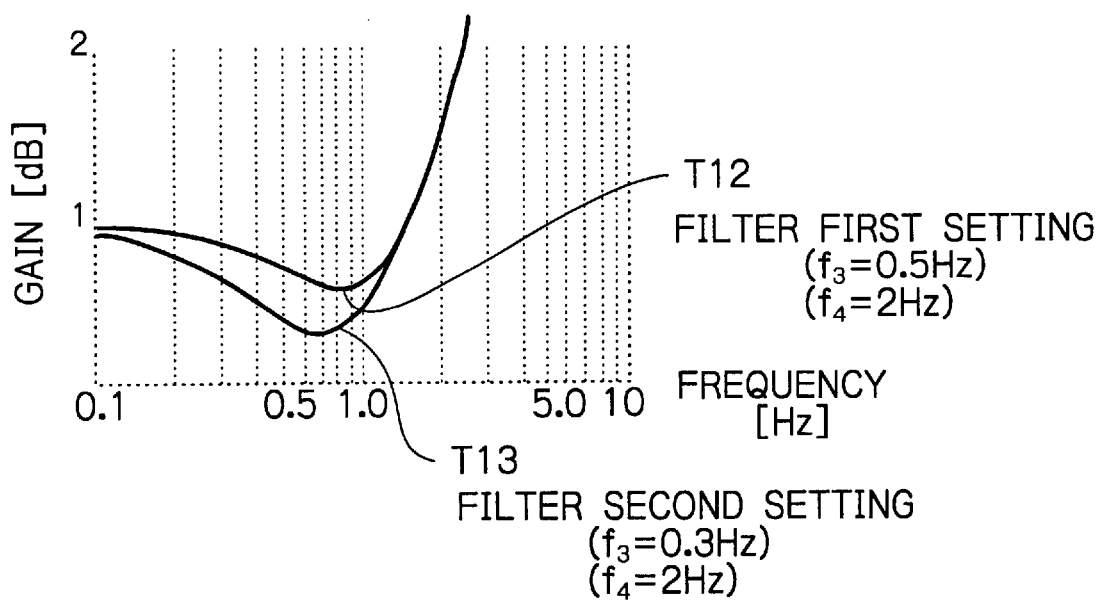
FIG. 29 is a diagram showing frequency-gain characteristics varying in accordance with the change in frequency at a relative velocity estimation unit in a seventh embodiment of the present invention.

In the seventh embodiment, when the steering speed R11 is judged to be less than the steering speed reference value R10 (i.e. YES is the answer at step S10C), the filter first setting operation determines the values of the time constants T1, T2, T3 and T4 [and hence adjusts the magnitudes of the gain and phase (adjusting parameters)] so as to provide gain characteristics represented by the segment T12 in FIG. 29. When the steering speed R11 is judged to be not less than the steering speed reference value R10 (i.e. NO is the answer at step S10C), the filter second setting operation determines the values of the time constants T1, T2, T3 and T4 [and hence adjusts the magnitudes of the gain and phase (adjusting parameters)] so as to provide gain characteristics represented by the segment T13 in FIG. 29.

Regarding the filter first setting operation (segment T12) and the filter second setting operation (segment T13), the gain D of the signal D is adjusted to the same magnitude in frequency regions above a frequency slightly higher than the neighborhood of vehicle body resonance point 20 (i.e. the vicinity of the sprung mass resonance frequency).

Regarding the segment T12 (filter first setting operation), for the time constant T3=1/(2πf3), f3 is set equal to 0.5 Hz. For the time constant T4=1/(2πf4), f4 is set equal to 2.0 Hz. Regarding the segment T13 (filter second setting operation), for the time constant T3=1/(2πf3), f3 is set equal to 0.3 Hz. For the time constant T4=1/(2πf4), f4 is set equal to 2.0 Hz.

In the seventh embodiment, when the steering speed R11 is not less than the steering speed reference value R10, the gain in high frequency regions is increased. Accordingly, the controlled variable is not increased in the high frequency regions. In low frequency regions, on the other hand, a sufficiently large controlled variable can be ensured. Therefore, it becomes possible to minimize vibrations that give an unfavorable floating feeling.

In the seventh embodiment, the filter constants are changed on the basis of the steering speed detected with the steering speed sensor 17B. However, it is also possible to use a steering angle in place of the steering speed. Alternatively, the horizontal acceleration or the rate of change in the horizontal acceleration may be used to change the filter constants.

The arrangement may also be such that a brake switch is provided in place of the steering speed sensor 17B, and the filter constants of the relative velocity estimation unit 16 are changed on the basis of brake information obtained from the brake switch (an eighth embodiment of the present invention). In the eighth embodiment, for example, when the brake is not activated, the values of the time constants T1, T2, T3 and T4 are determined [and hence the magnitudes of the gain and phase (adjusting parameters) are adjusted] so as to provide gain characteristics represented by the segment T10 in FIG. 28. When the brake is activated, the values of the time constants T1, T2, T3 and T4 are determined [and hence the magnitudes of the gain and phase (adjusting parameters) are adjusted] so as to provide gain characteristics represented by the segment T11 in FIG. 28.

In the eighth embodiment, when the brake is activated, a sufficiently large controlled variable can be ensured in low-frequency regions without increasing the controlled variable in high frequency regions, as in the case of the seventh embodiment. Accordingly, it becomes possible to minimize vibrations that give an unfavorable floating feeling.

It should be noted that the filter constants of the relative velocity estimation unit 16 may be changed on the basis of (1) information concerning deceleration of the vehicle, (2) a combination of the deceleration information and the brake information, (3) longitudinal acceleration, or (4) the rate of change in longitudinal acceleration, instead of using the brake information as in the eighth embodiment.

The filter constants of the relative velocity estimation unit 16 may be changed by using inter-road/vehicle information or inter-vehicle information (a ninth embodiment of the present invention) in place of the steering speed used in the sixth embodiment. In the ninth embodiment, when inter-road/vehicle information or inter-vehicle information indicates that the distance between two vehicles is short or indicates that the vehicle is in danger (danger information), for example, the values of the time constants T1, T2, T3 and T4 are determined [and hence the magnitudes of the gain and phase (adjusting parameters) are adjusted] so that the gain characteristic curve changes from the segment T10 to the segment T11 in FIG. 28.

In the ninth embodiment, when the distance between two vehicles is shorter than a reference value or when danger information is given, the controller 7 determines the values of the time constants T1, T2, T3 and T4 so as to provide gain characteristics represented by the segment T11 in FIG. 28. Therefore, it is possible to reduce sprung vibrations generated when the brake is activated and hence possible to improve steering stability. In this case, if the values of the time constants T1, T2, T3 and T4 are determined [and hence the magnitudes of the gain and phase (adjusting parameters) are adjusted] so as to provide gain characteristics represented by the segment T3 in FIG. 29, a sufficiently large controlled variable can be ensured in low-frequency regions without increasing the controlled variable in high frequency regions. Therefore, it becomes possible to minimize vibrations that give an unfavorable floating-feeling.

The filter constants of the relative velocity estimation unit 16 may be changed on the basis of information (user option information) obtained from a vehicle characteristic selecting switch for selecting a sports mode, a regular mode, etc. (a tenth embodiment of the present invention) instead of using the steering speed as in the sixth embodiment. In the tenth embodiment, for example, when the regular mode is selected, the values of the time constants T1, T2, T3 and T4 are determined so that gain characteristic represented by the segment T10 in FIG. 28 are obtained. When the sports mode is selected, the values of the time constants T1, T2, T3 and T4 are determined so as to provide gain characteristics represented by the segment T11 in FIG. 28.

The arrangement may be such that the filter constants of the relative velocity estimation unit 16 are changed on the basis of throttle opening information indicating the degree of opening of the throttle (an eleventh embodiment of the present invention), instead of using the steering speed as in the sixth embodiment. In the eleventh embodiment, for example, when the throttle opening is small. the values of the time constants T1, T2, T3 and T4 are determined so as to provide gain characteristics represented by the segment T10 in FIG. 28. When the throttle opening is large, the values of the time constants T1, T2, T3 and T4 are determined so as to provide gain characteristics represented by the segment T11 in FIG. 28. It should be noted that the filter constants of the relative velocity estimation unit 16 may be changed on the basis of (1) throttle opening speed information, (2) the rate of change in vehicle speed, or (3) the combination of the vehicle speed change rate and the throttle opening information, instead of using the throttle opening information as in the eleventh embodiment.

The arrangement may be such that the filter constants of the relative velocity estimation unit 16 are changed on the basis of headlight information indicating ON/OFF of the headlight (a twelfth embodiment of the present invention), instead of using the steering speed as in the sixth embodiment. In the twelfth embodiment, for example, when the headlight is off, the values of the time constants T1, T2, T3 and T4 are determined so as to provide gain characteristics represented by the segment T10 in FIG. 28.

When the headlight is on, the values of the time constants T1, T2, T3 and T4 are determined so as to provide gain characteristics represented by the segment T11 in FIG. 28.

When the vehicle is running at night (i.e. when the headlight is on), light from the headlight oscillates in response to vibrations of the vehicle body. Accordingly, the driver is visually sensitive to vibrations. Further, at night, the amount of information is smaller than in the daytime. Therefore, it may be necessary to cope with a situation in which the driver has to brake suddenly or turn the steering wheel suddenly. For these reasons, the filter constants are set as stated above.

In the twelfth embodiment, when the, headlight is on, the values of the time constants T1, T2, T3 and T4 are determined so as to provide gain characteristics represented by the segment T11 in FIG. 28. Accordingly, the controlled variable can be increased in all the frequency regions. Thus, it is possible to suppress vibrations during running at night.

It should be noted that the headlight information may be replaced by (1) clock information, (2) a combination of clock information (time) and calendar IC information (date), or (3) detected information from a sensor for detecting the amount of light (sunshine information).

The arrangement may also be such that the filter constants of the relative velocity estimation unit 16 are changed on the basis of detected information (friction coefficient information) from a sensor for detecting the coefficient of friction of a tire with respect to the road surface (a thirteenth embodiment of the present invention). In the thirteenth embodiment, for example, when the friction coefficient is small, the values of the time constants T1, T2, T3 and T4 are determined so as to provide gain characteristics represented by the segment T10 in FIG. 28. When the friction coefficient is large, the values of the time constants T1, T2, T3 and T4 are determined so as to provide gain characteristics represented by the segment T11 in FIG. 28.

When the friction coefficient of the tire is small owing to the weather or the road surface condition, if the controlled variable is increased easily, the vehicle is likely to become unstable owing to variations in ground contact force of the tire. Therefore, when the friction coefficient is small, the gain is increased (i.e. the gain characteristics are adjusted to those represented by the segment T10 in FIG. 28) so that the suspension characteristics (controlled variable) weaken.

It should be noted that the friction coefficient information may be replaced by (1) the rate of change in wheel speed, (2) wiper operation information, or (3) detected information from a raindrop sensor.

The arrangement may also be such that the filter constants of the relative velocity estimation unit 16 are changed on the basis of vehicle dive detection information (a fourteenth embodiment of the present invention), instead of using the steering speed as in the sixth embodiment. In the fourteenth embodiment, for example, when no dive is detected, the values of the time constants T1, T2, T3 and T4 are determined so as to provide gain characteristics represented by the segment T10 in FIG. 28. When dive is detected, the values of the time constants T1, T2, T3 and T4 are determined so as to provide gain characteristics represented by the segment T11 in FIG. 28.

The arrangement may also be such that the filter constants of the relative velocity estimation unit 16 are changed on the basis of vehicle squat information (a fifteenth embodiment of the present invention), instead of using the steering speed as in the sixth embodiment. In the fifteenth embodiment, for example, when no squat is detected, the values of the time constants T1, T2, T3 and T4 are determined so as to provide gain characteristics represented by the segment T10 in FIG. 28. When squat is detected, the values of the time constants T1, T2, T3 and T4 are determined so as to provide gain characteristics represented by the segment T11 in FIG. 28.

Next, a sixteenth embodiment of the present invention will be described with reference to FIGS. 30 to 36. It should be noted that illustration and description of members or portions equivalent to those in the first and seventh embodiments (FIGS. 1 to 29) are omitted according to circumstances.

Figure 30:
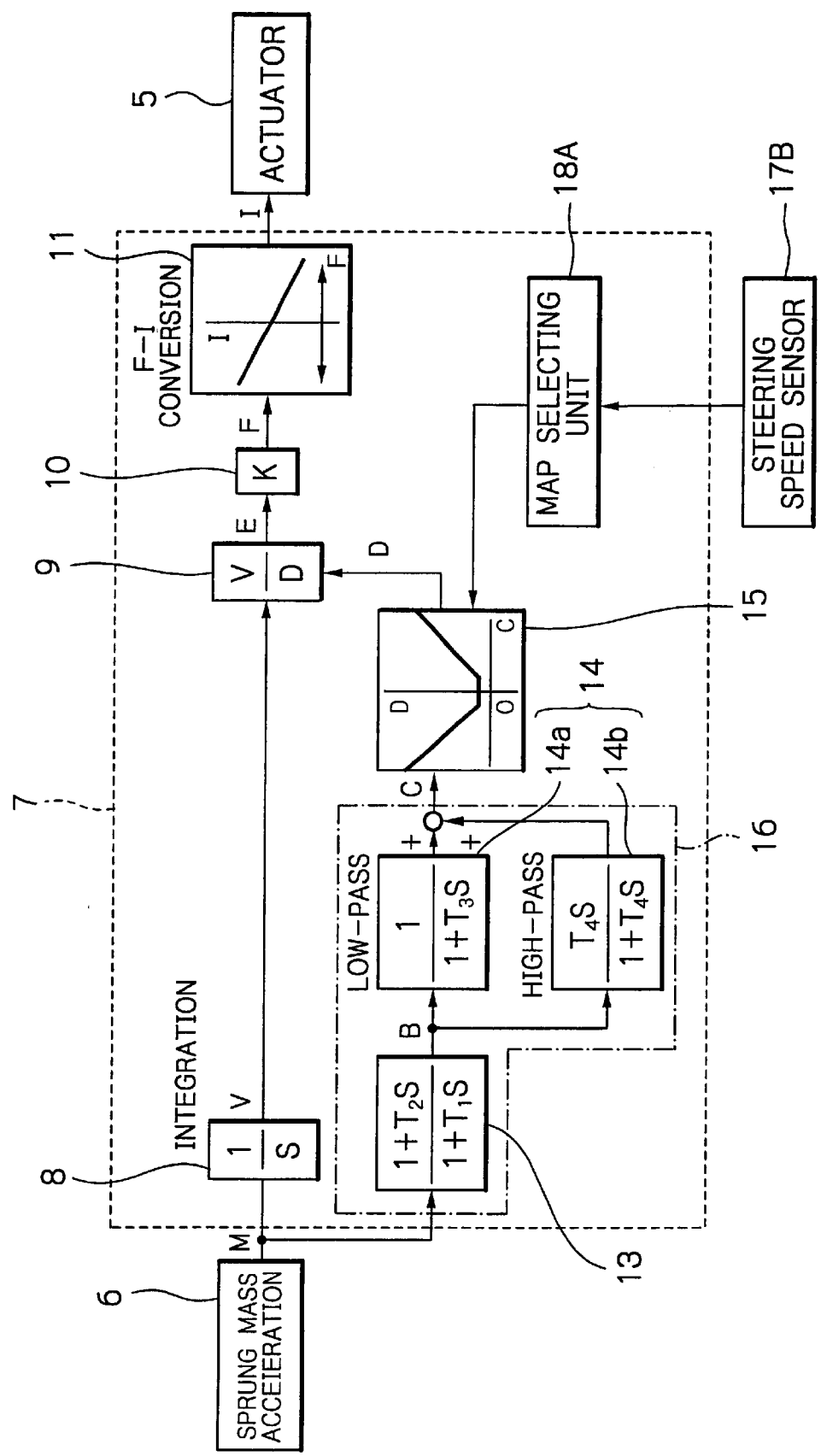
FIG. 30 is a block diagram showing a controller used in a suspension control system according to a sixteenth embodiment of the present invention.

The sixteenth embodiment differs from the sixth embodiment mainly in the following points (a) to (c):

(a) As shown in FIG. 30, the controller 7 is provided with a map selecting unit 18A.

(b) The controller 7 changes elements (dead zone height H1, dead zone width W, limit value H2, etc.) of the conversion segment 60 of a map (FIG. 35) in the absolute value computing unit 15, whereas the controller 7 in the sixth embodiment varies the values of the time constants T1, T2, T3 and T4 [and hence changes the filter constants (gain and phase) of the relative velocity estimation unit 16].

Figure 31:
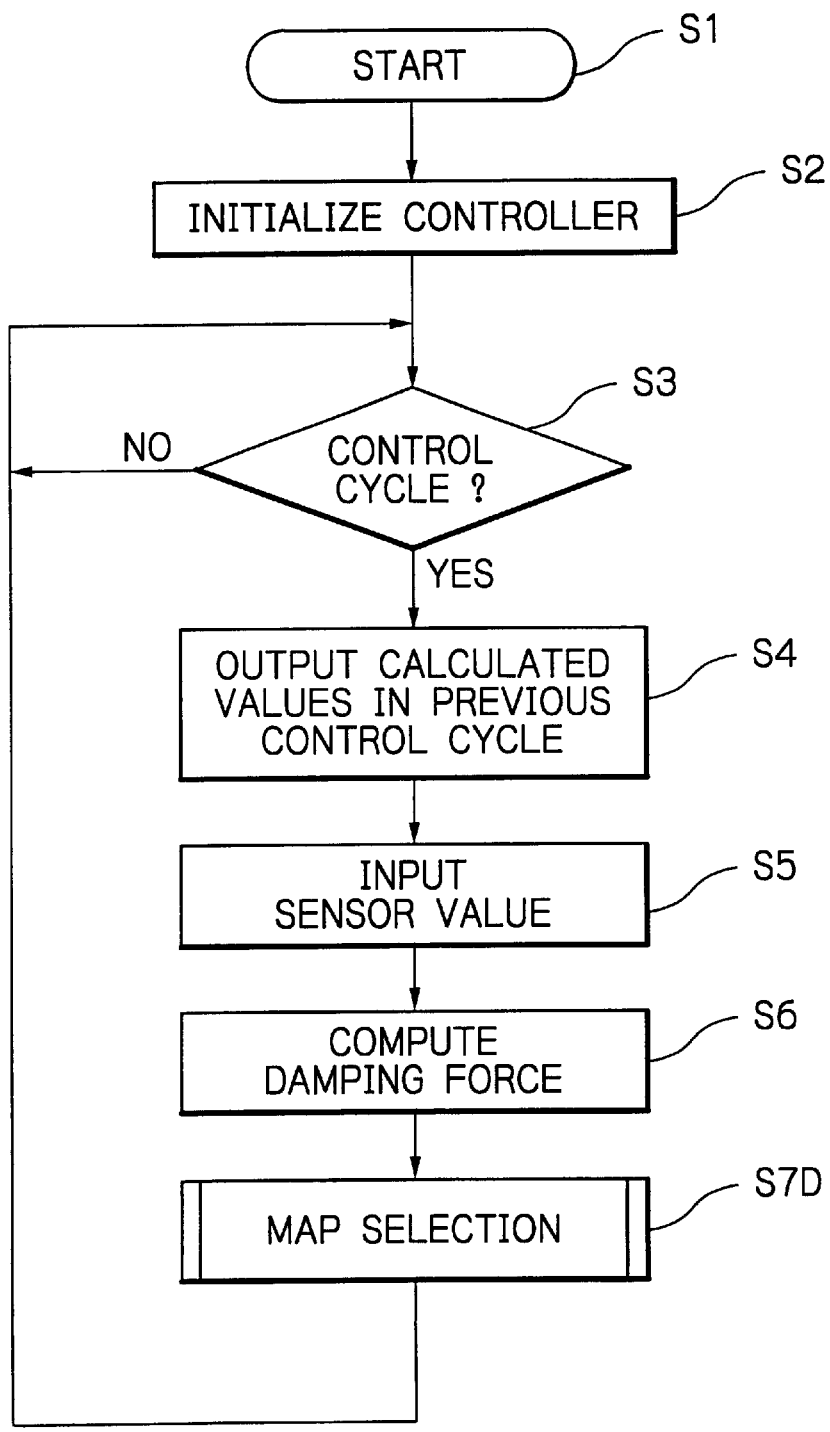
FIG. 31 is a flowchart showing a main routine executed by the controller shown in FIG. 30.
Figures 32, 33:
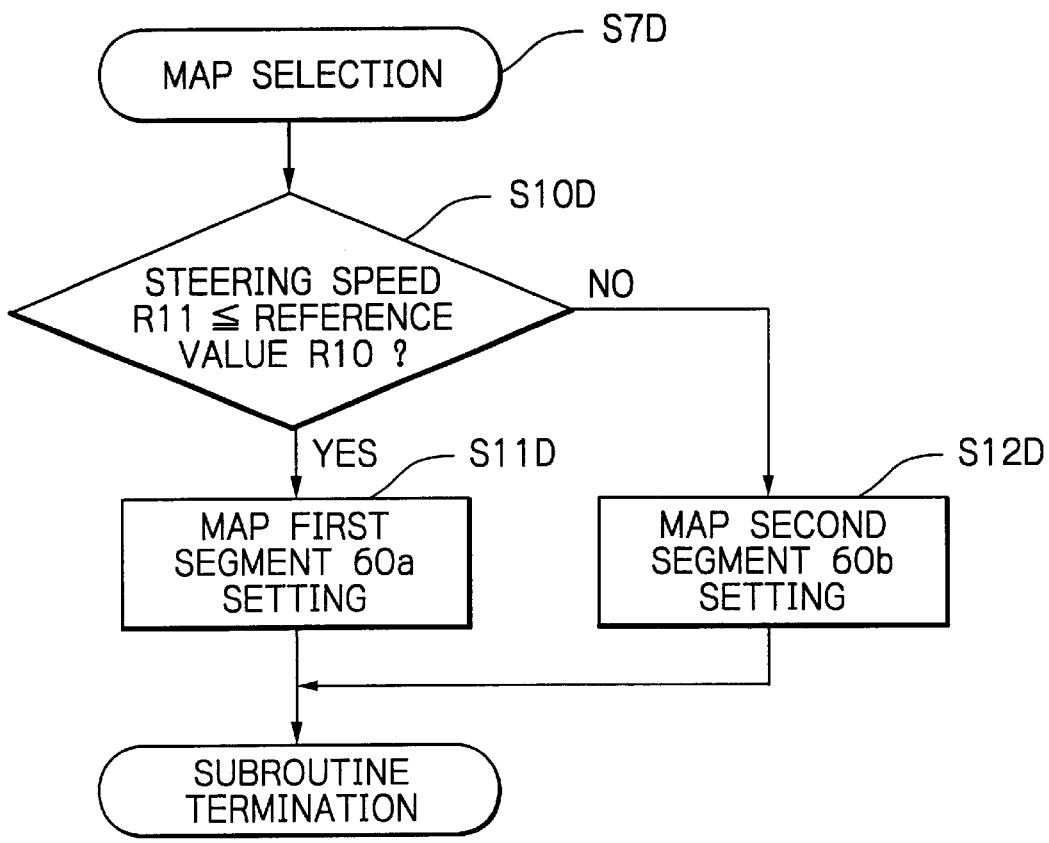
FIG. 32 is a flowchart showing a map selection subroutine in FIG. 31.
FIG. 33 is a diagram showing the relationship between each element of a segment for conversion used in the control operation of the controller shown in FIG. 30 and the controlled variable as Table 1.

(c) A map selection subroutine (step S7D) shown in FIGS. 31 and 32 is provided in place of the time constant determination subroutine (step S7C) shown in FIGS. 26 and 27.

The absolute value computing unit 15 has the conversion segment 60 stored therein in a map form in which the signal C is plotted along the abscissa axis, and the gain D along the ordinate axis. The conversion segment 60 has elements (dead zone height H1, dead zone width W, limit value H2, and inclination angle β) arranged to be changeable. The change of the elements is effected by the map selecting unit 18A. As shown in the frame indicating the absolute value computing unit 15 in FIG. 30 and also shown in FIG. 35, the conversion segment 60 keeps the gain D at a constant level when the signal C assumes a value in the neighborhood of "0" (including "0"). For the sake of convenience, the region where the gain D is kept at a constant level will hereinafter be referred to as "dead zone", and the gain D at a constant level in the dead zone will be referred to as "dead zone height H1". Further, the width of the signal C from the minimum value (left-hand side) to the maximum value (right-hand side) in the dead zone will be referred to as "dead zone width W [conversion characteristics].

The conversion segment 60 has a predetermined angle of inclination (rate of change) β [conversions characteristics] in a +(plus)-side region in which the signal C exceeds the dead zone (the right-hand region in FIG. 35) and also in a −(minus)-side region in which the signal C is below the dead zone (the left-hand region in FIG. 35). Further, when the signal C becomes larger a predetermined magnitude in the plus-side region or becomes smaller than a predetermined magnitude in the minus-side region, the gain D is kept at a constant level (hereinafter referred to as "limit value H2") [conversion characteristics].

At step S7D (map selection subroutine), as shown in FIG. 32, the controller 7 judges whether or not the steering speed R11 is less than the steering speed reference value R10 (step S10D). If it is judged at step S10D that the steering speed R11 is less than the steering speed reference value R10 (YES), the controller 7 executes an operation for setting a map first segment 60a (see Table 2 in FIG. 34) at step S11D, and then returns to the main routine. If it is judged at step S10D that the steering speed R11 is not less than the steering speed reference value R10 (NO), the controller 7 executes an operation for setting a map second segment 60b (Table 2 in FIG. 34), and then returns to the main routine.

The elements (dead zone height H1, dead zone width W, limit value H2, and inclination angle β) [conversion characteristics] of the conversion segment 60 (the map first segment 60a and the map second segment 60b) are arranged to be changeable so that the magnitude of the controlled variable (command current I) changes according to the magnitude of the value of each element, as shown in Table 1 of FIG. 33. In this embodiment, the size of each element is set as shown in Table 2 of FIG. 34, so that when the map first segment 60a is set, the controlled variable becomes small, whereas when the map second segment 60b is set, the controlled variable becomes large.

In the sixteenth embodiment arranged as stated above, when the steering speed R11 is not less than the steering speed reference value R10, the map second segment 60b (Table 2 in FIG. 34) is set (step S12D). Consequently, the controlled variable (command current I) becomes large. Accordingly, it is possible to improve steering stability and ride quality.

In addition, the elements (dead zone height H1, dead zone width W, limit value H2, and inclination angle β) [conversion characteristics] of the conversion segment 60 (the map first segment 60a and the map second segment 60b) are changeable. Thus, the controlled variable (command current I) is changed according to the size ,of the value of each element. This makes it possible to ensure damping characteristic control of high accuracy.

In the sixteenth embodiment, all the elements (dead zone height H1, dead zone width W, limit value H2, and inclination angle β) of the conversion segment 60 (the map first segment 60a and the map second segment 60b) are changed, by way of example. However, the arrangement may be such that one, two or three of the elements (dead zone height H1, dead zone width W, limit value H2, and inclination angle β) are changed to change the controlled variable (command current I).

Figures 34, 35:
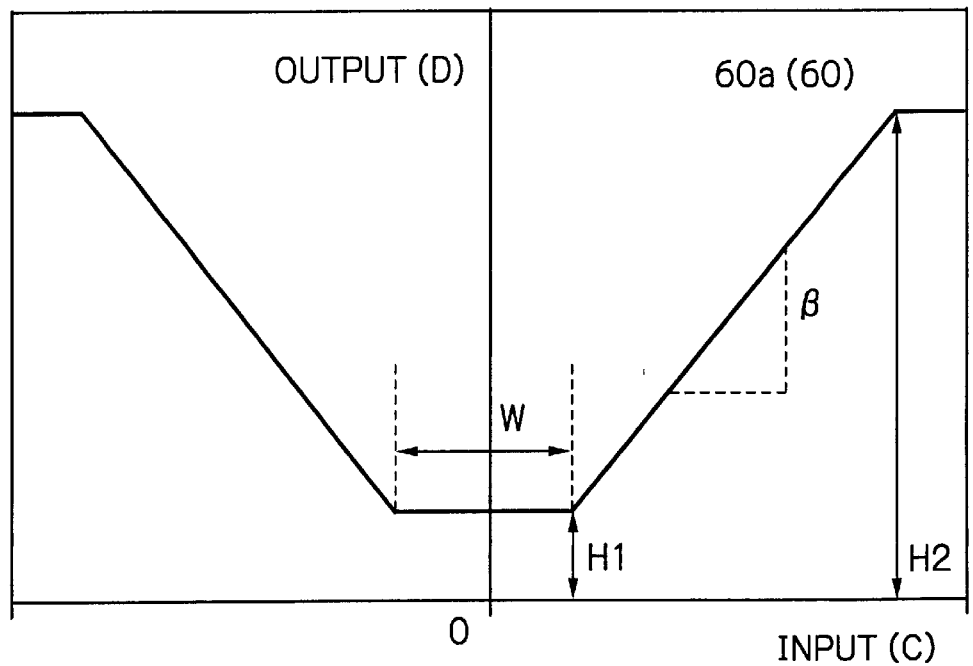
FIG. 34 is a diagram showing the relationship between the conversion segment, map first segment and map second segment used in the control operation of the controller shown in FIG. 30 and the controlled variable as Table 2.
FIG. 35 is a diagram showing an example of maps used in the controller shown in FIG. 30.
Figure 36:
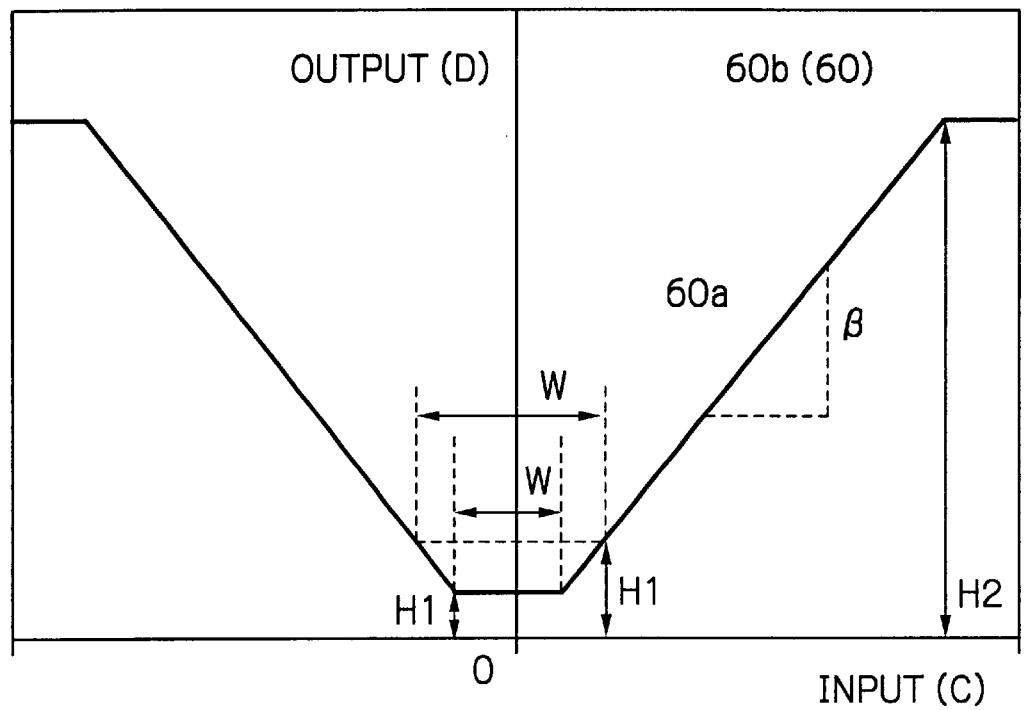
FIG. 36 is a diagram showing another example of maps used in the controller shown in FIG. 30.

For example, the arrangement may be such that for a map first segment 60a shown by the solid line in FIG. 35 and by the dotted line in FIG. 36, only the dead zone height H1 and the dead zone width W are changed to set a map second segment 60b shown by the solid line in FIG. 36. For the map first segment 60a and the map second segment 60b, the limit value H2 and the inclination angle β are set equally. In terms of the dead zone height H1 or the dead zone width W, the map second segment 60b is shorter than the map first segment 60a.

By changing the dead zone as shown in FIG. 36, it is possible to change the controlled variable only for vibrations that give a low estimated relative velocity without changing the damping characteristics for vibrations that give a high estimated relative velocity. Thus, it becomes possible to suppress slight vibrations.

In the sixteenth embodiment, the change of each element of the conversion segment 60 (the map first segment 60a and the map second segment 60b) is made on the basis of the steering speed. However, the steering angle may be used in place of the steering speed.

Further, the change of each element of the conversion segment 60 (the map first segment 60a and the map second segment 60b) may be made by using information as shown below.

(1) Brake information (detected signal from the brake switch, deceleration, a combination of deceleration and brake switch information, longitudinal acceleration, or the rate of change in longitudinal acceleration).

(2) Inter-road/vehicle information, or inter-vehicle information.

(3) Information (user option information) obtained from a vehicle characteristic selecting switch for selecting a sports mode, a regular mode, etc.

(4) Throttle information (throttle opening information, throttle opening speed, the rate of change in vehicle speed, or a combination of the vehicle speed change rate and throttle opening information).

(5) Time information (headlight information, clock information, a combination of clock information and calendar IC information, or detected information from a light-intensity detecting sensor).

(6) Coefficient of friction of tire with respect to the road surface (the rate of change in wheel speed, wiper operation information, or detected information from a raindrop sensor).

(7) Road surface condition information (acceleration, detected information from a vehicle height sensor, or detected information from a non-contact road surface sensor).

(8) Vehicle mode (bouncing, pitching, or rolling)

(9) Vehicle speed information (vehicle speed, wheel speed, combination of gear position information and engine speed information, or information from GPS).

(10) Vehicle weight information (seat switch information, air suspension pressure information, shock absorber cylinder pressure information, gasoline gauge information, seat belt ON/OFF signal, or light optical-axis adjustment information).

As has been detailed above, the suspension control system according to the present invention eliminates the phase difference of the acceleration of vibration data with respect to the estimated piston speed in the sprung mass resonance frequency band. Accordingly, it is possible to generate damping force closer in magnitude to damping force expected in control based on the sky-hook damper theory. Thus, it is possible to achieve an improvement in controllability.

Further, in high-frequency regions, the controlled variable can be reduced positively. Thus, it is possible to minimize degradation of ride quality caused by a delay in control and hence possible to ensure favorable ride quality.

In addition, the use of a damping characteristic inverting type shock absorber dispenses with a vehicle height sensor and hence makes it possible to attain high performance at reduced costs.

Further, according to the present invention, the phase adjustment for the detected signal is made on the basis of adjusting parameters for the detected signal, and the characteristics of the adjusting parameters are changed. Therefore, it becomes possible to adjust the controlled variable (control signal) by changing the characteristics of the adjusting parameters. Thus, it is possible to ensure damping characteristic control of high accuracy.

Further, according to the present invention, the relative velocity obtained from the relative velocity estimation unit is converted into a signal for generating the control signal on the basis of predetermined conversion characteristics, and the conversion characteristics are changed according to the condition of the vehicle or/and the road surface condition. Therefore, it is possible to change the controlled variable (control signal) according to the condition of the vehicle or/and the road surface condition and hence possible to effect damping characteristic control with correspondingly high accuracy.

Further, according to one aspect of the invention, the aforesaid adjusting parameters are varied based on a vehicle condition related to a weight of the vehicle. Thus, it is possible to ensure damping characteristic control of high accuracy even when the vehicle weight varies due, to change in the number of passengers and luggage load, for instance.

Further, according to another aspect of the invention, the aforesaid adjusting parameters are varied based on a vehicle condition related to a speed of the vehicle. Thus, it is possible to ensure damping characteristic control of high accuracy even when the vehicle speed varies, due to a road condition, for instance.

Further, according to another aspect of the invention, the aforesaid adjusting parameters are varied based on a vehicle condition related to a change in attitude of the vehicle. Thus, it is possible to ensure damping characteristic control of high accuracy even when the vehicle's attitude varies, as it turns, accelerates or decelerates, for instance.

Further, according to another aspect of the invention, the aforesaid conversion characteristics are varied based on a vehicle condition related to a change in a weight of the vehicle. Thus, even when the weight of the vehicle varies, due to change in the number of passengers and luggage load, for instance, it is possible to change a value of control (control signal) depending on the change in the vehicle weight. Therefore, it is possible to ensure damping characteristic control of high accuracy.

Further, according to another aspect of the invention, the aforesaid conversion characteristics are varied based on a vehicle condition related to a speed of the vehicle. Thus, even when the speed of the vehicle varies, due to a change in road condition, for instance, it is possible to vary an amount of control (control signal) depending on the change in the vehicle speed. Therefore, it is possible to ensure damping characteristic control of high accuracy.

Further, according to another aspect of the invention, the aforesaid conversion characteristics are varied based on a vehicle condition related to a change in attitude of the vehicle. Thus, even when the vehicle's attitude varies, as it turns, accelerates or decelerates, for instance, it is possible to vary an amount of control (control signal) depending on the change I the vehicle's attitude. Therefore, it is possible to ensure damping characteristic control of high accuracy.

Further, according to another aspect of the invention, an acceleration sensor is used as a sprung mass vibration detecting device and a relative velocity estimation device uses an acceleration detected with the acceleration sensor as an estimated relative velocity between the sprung member and unsprung member. Thus, reduction in cost for producing a suspension control system is realized with a cheap acceleration sensor.

It should be noted that the present invention is not necessarily limited to the foregoing embodiments but can be modified in a variety of ways without departing from the gist of the present invention.

What is claimed is:

1. A suspension control system comprising:
   a shock absorber having adjustable damping characteristics, said shock absorber being interposed between a sprung member and an unsprung member of a vehicle;
   a sprung mass vibration detecting device for detecting vibration of the sprung member of the vehicle;
   a sprung mass absolute velocity detecting device for obtaining an absolute velocity of the vibration of the sprung member from a detected signal obtained from said sprung mass vibration detecting device;
   a relative velocity estimation device for adjusting a phase of the detected signal obtained from said sprung mass vibration detecting device to use said detected signal as an estimated relative velocity between said sprung member and said unsprung member; and
   a control unit for generating a control signal for controlling the damping characteristics of said shock absorber on a basis of the absolute velocity obtained from said sprung mass absolute velocity detecting device and the estimated relative velocity obtained from said relative velocity estimation device and for outputting said control signal to said shock absorber;
   wherein said relative velocity estimation device adjusts the phase of said detected signal so that a phase difference of said detected signal with respect to an actual relative velocity is minimized in a sprung mass resonance frequency band.

2. A suspension control system according to claim 1, wherein adjustment of the phase of said detected signal is made on a basis of adjusting parameters for said detected signal, and characteristics of said adjusting parameters are changed according to a condition of the vehicle.

3. A suspension control system according to claim 2, wherein said condition of the vehicle is a vehicle condition related to a weight of said vehicle.

4. A suspension control system according to claim 2, wherein said condition of the vehicle is a vehicle condition related to a speed of said vehicle.

5. A suspension control system according to claim 2, wherein said condition of the vehicle is a vehicle condition related to a change in attitude of said vehicle.

6. A suspension control system according to claim 1, wherein said control unit judges a road surface condition on a basis of the detected signal obtained from said sprung mass vibration detecting device, and adjustment of the phase of said detected signal is made on a basis of adjusting parameters for said detected signal, and further characteristics of said adjusting parameters are changed according to a result of judgment on said road surface condition.

7. A suspension control system according to claim 1, wherein said control unit converts the relative velocity obtained from said relative velocity estimation device into a signal for generating said control signal on a basis of predetermined conversion characteristics and changes said conversion characteristics according to a condition of the vehicle and/or a road surface condition.

8. A suspension control system according to claim 7, wherein said condition of the vehicle is a vehicle condition related to a weight of said vehicle.

9. A suspension control system according to claim 7, wherein said condition of the vehicle is a vehicle condition related to a speed of said vehicle.

10. A suspension control system according to claim 7, wherein said condition of the vehicle is a vehicle condition related to a change in attitude of said vehicle.

11. A suspension control system according to claim 1, wherein said sprung mass vibration detecting device is an acceleration sensor, and said relative velocity estimation device uses an acceleration detected with said acceleration sensor as an estimated relative velocity between said sprung member and said unsprung member.

* * * * *